US008224355B2

(12) United States Patent
Beydler et al.

(10) Patent No.: US 8,224,355 B2
(45) Date of Patent: Jul. 17, 2012

(54) SYSTEM AND METHOD FOR IMPROVED COMMUNICATION BANDWIDTH UTILIZATION WHEN MONITORING LOCATION INFORMATION

(75) Inventors: Michael L. Beydler, Irvine, CA (US);
Roger B. Anderson, Arcadia, CA (US);
Joseph F. Scalisi, Yorba Linda, CA (US);
Desiree Mejia, Redondo Beach, CA (US); David M. Morse, Laguna Hills, CA (US)

(73) Assignee: Location Based Technologies Inc., Irvine, CA (US)

( * ) Notice: Subject to any disclaimer, the term of this patent is extended or adjusted under 35 U.S.C. 154(b) by 998 days.

(21) Appl. No.: 12/143,436

(22) Filed: Jun. 20, 2008

(65) Prior Publication Data

US 2009/0117921 A1    May 7, 2009

Related U.S. Application Data

(63) Continuation-in-part of application No. 11/935,901, filed on Nov. 6, 2007.

(51) Int. Cl.
*H04W 64/00* (2009.01)
(52) U.S. Cl. ............... 455/457; 455/456.5; 701/207; 709/224
(58) Field of Classification Search ............ 455/411, 455/414.1–414.4, 452.2, 456.1–456.6, 457, 455/406–408; 715/753, 751, 733; 709/224; 701/211, 200, 201, 202, 206; 342/343, 417
See application file for complete search history.

(56) References Cited

U.S. PATENT DOCUMENTS

| 3,924,102 | A | 12/1975 | Hanekom |
| 4,218,582 | A | 8/1980 | Hellman et al. |
| 4,850,007 | A | 7/1989 | Marino et al. |
| 5,079,541 | A | 1/1992 | Moody |
| 5,127,042 | A | 6/1992 | Gillig et al. |
| 5,353,331 | A | 10/1994 | Emery et al. |

(Continued)

FOREIGN PATENT DOCUMENTS

JP    10325735    12/1998

(Continued)

OTHER PUBLICATIONS

Huff, Greg H., et al., "Directional Reconfigurable Antennas on Laptop Computers: Simulation, Measurement and Evaluation of Candidate Integration Positions", *IEEE Transactions on Antenaas*, vol. 52, No. 12, (Dec. 2004), pp. 3220-3227.

(Continued)

*Primary Examiner* — Kamran Afshar
*Assistant Examiner* — Khawar Iqbal

(57) ABSTRACT

A personalized format webpage is generated to monitor location information. A graphical mapping module is disclosed to provide mapping tiles from multiple mapping service providers in response to user request for location information of a tracking device associated with an object or an individual. A wizard menu enables the user to reorient an initial request for mapping tiles in a different layout or view format without requiring additional access to a mapping service provider website. Alert messages associated with the tracking device are generated in accordance with selected alert zones. Dashboard management tools may be included or associated with a software file readily accessible and functionally equipped to interpret user requests for mapping reorientation and zoom capabilities.

10 Claims, 38 Drawing Sheets

U.S. PATENT DOCUMENTS

| | | | |
|---|---|---|---|
| 5,386,468 | A | 1/1995 | Akiyama et al. |
| 5,432,542 | A | 7/1995 | Thibadeau et al. |
| 5,541,976 | A | 7/1996 | Ghisler |
| 5,565,909 | A | 10/1996 | Thibadeau et al. |
| 5,592,173 | A | 1/1997 | Lau et al. |
| 5,785,181 | A | 7/1998 | Quartararo, Jr. |
| 5,862,511 | A | 1/1999 | Croyle et al. |
| 5,876,765 | A | 3/1999 | Hinterlechner |
| 5,967,841 | A | 10/1999 | Bianca et al. |
| 5,973,599 | A | 10/1999 | Nicholson et al. |
| 6,088,453 | A | 7/2000 | Shimbo |
| 6,141,356 | A | 10/2000 | Gorman |
| 6,236,365 | B1 | 5/2001 | LeBlanc et al. |
| 6,243,039 | B1 | 6/2001 | Elliot |
| 6,278,370 | B1 | 8/2001 | Underwood |
| 6,300,875 | B1 | 10/2001 | Schafer |
| 6,327,533 | B1 | 12/2001 | Chou |
| 6,388,612 | B1 | 5/2002 | Neher |
| 6,414,629 | B1 | 7/2002 | Curcio |
| 6,441,741 | B1 | 8/2002 | Yoakum |
| 6,445,921 | B1 | 9/2002 | Bell |
| 6,453,037 | B1 | 9/2002 | Welter, Jr. |
| 6,498,797 | B1 | 12/2002 | Anerousis et al. |
| 6,546,253 | B1 | 4/2003 | Chow et al. |
| 6,611,755 | B1 | 8/2003 | Coffee et al. |
| 6,633,835 | B1 | 10/2003 | Moran et al. |
| 6,654,883 | B1 | 11/2003 | Tatebayashi |
| 6,674,368 | B2 | 1/2004 | Hawkins et al. |
| 6,708,028 | B1 | 3/2004 | Byrne |
| 6,716,101 | B1 | 4/2004 | Meadows |
| 6,732,090 | B2 | 5/2004 | Shanahan et al. |
| 6,735,630 | B1 | 5/2004 | Gelvin et al. |
| 6,747,561 | B1 | 6/2004 | Reeves et al. |
| 6,754,470 | B2 | 6/2004 | Hendrickson et al. |
| 6,768,942 | B1 | 7/2004 | Chojnacki |
| 6,774,838 | B2 | 8/2004 | Sun |
| 6,778,089 | B2 | 8/2004 | Yoakum |
| 6,812,824 | B1 | 11/2004 | Goldinger et al. |
| 6,819,247 | B2 | 11/2004 | Birnbach et al. |
| 6,833,787 | B1 | 12/2004 | Levi |
| 6,850,252 | B1 | 2/2005 | Hoffberg |
| 6,859,533 | B1 | 2/2005 | Wang et al. |
| 6,879,244 | B1 | 4/2005 | Scalisi |
| 6,882,897 | B1 | 4/2005 | Fernandez |
| 6,928,280 | B1 | 8/2005 | Xanthos et al. |
| 6,937,726 | B1 | 8/2005 | Wang |
| 6,952,181 | B2 | 10/2005 | Karr et al. |
| 6,975,941 | B1 | 12/2005 | Lau |
| 6,978,021 | B1 | 12/2005 | Chojnacki |
| 6,988,026 | B2 | 1/2006 | Breed et al. |
| 6,992,584 | B2 | 1/2006 | Dooley et al. |
| 6,998,985 | B2 | 2/2006 | Reisman et al. |
| 6,998,995 | B2 | 2/2006 | Nakajima |
| 7,020,701 | B1 | 3/2006 | Gelvin et al. |
| 7,038,590 | B2 | 5/2006 | Hoffman et al. |
| 7,049,957 | B2 | 5/2006 | Watson |
| 7,064,711 | B2 | 6/2006 | Strickland et al. |
| 7,065,244 | B2 | 6/2006 | Akimov |
| 7,065,348 | B1 | 6/2006 | Aoki |
| 7,065,370 | B2 | 6/2006 | Ogaki et al. |
| 7,079,650 | B1 | 7/2006 | Knudsen |
| 7,088,242 | B2 | 8/2006 | Aupperle et al. |
| 7,088,252 | B2 | 8/2006 | Weekes |
| 7,099,921 | B1 | 8/2006 | Engstrom et al. |
| 7,109,868 | B2 | 9/2006 | Yoakum |
| 7,119,669 | B2 | 10/2006 | Lundsgaard et al. |
| 7,120,928 | B2 | 10/2006 | Sheth et al. |
| 7,139,396 | B2 | 11/2006 | Montgomery et al. |
| 7,146,367 | B2 | 12/2006 | Shutt |
| 7,149,189 | B2 | 12/2006 | Huntington et al. |
| 7,155,238 | B2 | 12/2006 | Katz |
| 7,158,912 | B2 | 1/2007 | Vock et al. |
| 7,181,192 | B2 | 2/2007 | Panasik et al. |
| 7,200,673 | B1 | 4/2007 | Augart |
| 7,218,242 | B2 | 5/2007 | Scalisi et al. |
| 7,246,007 | B2 | 7/2007 | Ferman |
| 7,257,836 | B1 | 8/2007 | Moore et al. |
| 7,268,700 | B1 | 9/2007 | Hoffberg |
| 7,272,212 | B2 | 9/2007 | Eberle et al. |
| 7,272,662 | B2 | 9/2007 | Chesnais et al. |
| 7,284,191 | B2 | 10/2007 | Grefenstette et al. |
| 7,292,223 | B2 | 11/2007 | Suprun et al. |
| 7,299,277 | B1 | 11/2007 | Moran et al. |
| 7,302,634 | B2 | 11/2007 | Lucovsky et al. |
| 7,313,825 | B2 | 12/2007 | Redlich et al. |
| 7,501,952 | B2 | 3/2009 | Forster |
| 7,501,984 | B2 | 3/2009 | Forster et al. |
| 7,598,855 | B2 | 10/2009 | Scalisi et al. |
| 7,612,663 | B2 | 11/2009 | Sun |
| 7,626,499 | B2 | 12/2009 | Burneske et al. |
| 7,728,724 | B1 | 6/2010 | Scalisi et al. |
| 7,742,774 | B2* | 6/2010 | Oh et al. .................... 455/456.1 |
| 7,995,994 | B2 | 8/2011 | Khetawat et al. |
| 2001/0030667 | A1 | 10/2001 | Kelts |
| 2001/0048364 | A1 | 12/2001 | Kalthoff et al. |
| 2002/0041328 | A1 | 4/2002 | LeCompte et al. |
| 2002/0067256 | A1 | 6/2002 | Kail, IV |
| 2002/0077130 | A1 | 6/2002 | Owensby |
| 2002/0180602 | A1 | 12/2002 | Yoakum |
| 2002/0186135 | A1 | 12/2002 | Wagner |
| 2002/0196123 | A1 | 12/2002 | Diehl et al. |
| 2003/0043200 | A1 | 3/2003 | Faieta et al. |
| 2003/0131073 | A1 | 7/2003 | Lucovsky et al. |
| 2003/0177094 | A1 | 9/2003 | Needham et al. |
| 2003/0208518 | A1 | 11/2003 | Gura et al. |
| 2003/0210262 | A1 | 11/2003 | Gahm et al. |
| 2003/0212729 | A1 | 11/2003 | Eberle et al. |
| 2003/0235307 | A1 | 12/2003 | Miyamoto |
| 2004/0010689 | A1 | 1/2004 | Vanstone et al. |
| 2004/0021573 | A1 | 2/2004 | Hoffman et al. |
| 2004/0165726 | A1 | 8/2004 | Yamamichi et al. |
| 2004/0166879 | A1* | 8/2004 | Meadows .......... 455/456.1 |
| 2004/0172403 | A1 | 9/2004 | Steele et al. |
| 2004/0212493 | A1 | 10/2004 | Stilp |
| 2005/0012620 | A1 | 1/2005 | Yoakum |
| 2005/0024201 | A1 | 2/2005 | Culpepper et al. |
| 2005/0044356 | A1 | 2/2005 | Srivastava et al. |
| 2005/0071282 | A1 | 3/2005 | Lu et al. |
| 2005/0071736 | A1 | 3/2005 | Schneider et al. |
| 2005/0099303 | A1 | 5/2005 | Suckerman |
| 2005/0113124 | A1 | 5/2005 | Syrjarinne et al. |
| 2005/0145688 | A1 | 7/2005 | Milenkovic et al. |
| 2005/0159883 | A1 | 7/2005 | Humphries et al. |
| 2005/0181870 | A1 | 8/2005 | Nguyen et al. |
| 2005/0188403 | A1 | 8/2005 | Kotzin |
| 2005/0202830 | A1* | 9/2005 | Sudit ........................ 455/456.1 |
| 2005/0210260 | A1 | 9/2005 | Venkatesan et al. |
| 2005/0246647 | A1 | 11/2005 | Beam et al. |
| 2005/0248459 | A1 | 11/2005 | Bonalle et al. |
| 2006/0009152 | A1 | 1/2006 | Millard et al. |
| 2006/0084420 | A1 | 4/2006 | Smith et al. |
| 2006/0161377 | A1 | 7/2006 | Rakkola et al. |
| 2006/0205416 | A1* | 9/2006 | Kayzar et al. .............. 455/456.1 |
| 2006/0206246 | A1 | 9/2006 | Walker |
| 2006/0211405 | A1 | 9/2006 | Scalisi et al. |
| 2006/0232429 | A1 | 10/2006 | Gonzalez |
| 2006/0253590 | A1 | 11/2006 | Nagy et al. |
| 2006/0290497 | A1 | 12/2006 | Sugata |
| 2007/0028088 | A1 | 2/2007 | Bayrak et al. |
| 2007/0033531 | A1 | 2/2007 | Marsh |
| 2007/0053513 | A1 | 3/2007 | Hoffberg |
| 2007/0054530 | A1 | 3/2007 | Bauer et al. |
| 2007/0057068 | A1 | 3/2007 | Tsai |
| 2007/0061303 | A1 | 3/2007 | Ramer et al. |
| 2007/0073719 | A1 | 3/2007 | Ramer et al. |
| 2007/0083819 | A1 | 4/2007 | Shoemaker |
| 2007/0103296 | A1 | 5/2007 | Paessel et al. |
| 2007/0159322 | A1 | 7/2007 | Garratt Campbell |
| 2007/0229350 | A1* | 10/2007 | Scalisi et al. ................. 342/350 |
| 2007/0255620 | A1 | 11/2007 | Tumminaro et al. |
| 2007/0287473 | A1 | 12/2007 | Dupray |
| 2007/0288427 | A1 | 12/2007 | Ramer et al. |
| 2008/0010585 | A1 | 1/2008 | Schneider et al. |
| 2008/0028063 | A1* | 1/2008 | Holmes et al. ................. 709/224 |
| 2008/0059504 | A1 | 3/2008 | Barbetta et al. |
| 2008/0059889 | A1 | 3/2008 | Parker et al. |
| 2008/0088437 | A1* | 4/2008 | Aninye et al. ............. 340/539.13 |

| | | | |
|---|---|---|---|
| 2008/0090550 | A1 | 4/2008 | Scalisi et al. |
| 2008/0108370 | A1 | 5/2008 | Aninye |
| 2008/0109762 | A1 | 5/2008 | Hundal et al. |
| 2008/0129491 | A1* | 6/2008 | Ruperto ............... 340/539.13 |
| 2008/0171559 | A1* | 7/2008 | Frank et al. ............ 455/456.5 |
| 2008/0172173 | A1 | 7/2008 | Chang et al. |
| 2008/0227473 | A1* | 9/2008 | Haney ...................... 455/457 |
| 2008/0228654 | A1 | 9/2008 | Edge |
| 2008/0252254 | A1 | 10/2008 | Osada |
| 2008/0252459 | A1 | 10/2008 | Butler et al. |
| 2009/0098857 | A1* | 4/2009 | De Atley ................... 455/411 |
| 2009/0098903 | A1 | 4/2009 | Donaldson et al. |
| 2009/0103722 | A1 | 4/2009 | Anderson et al. |
| 2009/0111393 | A1 | 4/2009 | Scalisi et al. |
| 2009/0119119 | A1* | 5/2009 | Scalisi et al. ................. 705/1 |
| 2009/0174603 | A1 | 7/2009 | Scalisi et al. |
| 2009/0177385 | A1* | 7/2009 | Matas et al. ............... 701/209 |
| 2009/0189807 | A1 | 7/2009 | Scalisi et al. |
| 2009/0315706 | A1 | 12/2009 | Scalisi et al. |
| 2009/0315767 | A1 | 12/2009 | Scalisi et al. |
| 2012/0086571 | A1 | 4/2012 | Scalisi et al. |
| 2012/0089492 | A1 | 4/2012 | Scalisi et al. |

FOREIGN PATENT DOCUMENTS

| | | |
|---|---|---|
| JP | 11064480 | 3/1999 |
| JP | 13074494 | 3/2001 |
| KR | 1020020001257 | 1/2002 |
| KR | 1020050063802 | 6/2005 |
| KR | 1005322589 | 11/2005 |
| WO | WO-2007107022 | 9/2007 |

OTHER PUBLICATIONS

Fredrick, Jonathan D., et al., "Smart Antennas Based on Spatial Multiplexing of Local Elements (SMILE) for Mutual Coupling Reduction", *IEEE Transactions on Antennas and Propagation*, vol. 52, No. 1, (Jan. 2004),pp. 106-114.

"Electric Vehicle (EV) Charging Information", *Pasadena Water & Power Website*, www.cityofpasadena.net,.

"Mobile Transmit Diversity", *Magnilia Broadband Internet Article*, 14 pages.

Hansen, Michael "Overmolding: A Multifaceted Medical Device Technology", *Medical Device & Diagnostic Industry*, (Jan. 2006),5 pages.

"Material Property Data for Various Thermoplastic Elastomers", *MATLAB*, (May 29, 2007),7 pages.

Mannion, Patrick "Antenna Diversity Doubles CDMA Net Capacity", *EE Times*, (May 12, 2003),3 pages.

Burk, Steve "Overmolding of Embedded Electronics", *Connector Specifier*, Retrieved from the Internet at http:/cs.pennet.com on May 20, 2007,(Apr. 2001),4 pages.

Schuster, Mike et al., "Increasing the Frequency Response of the ADXL Series Accelerometers", *Analog Devices Application Note AN-377*, (Feb. 2006),1 page.

"Small and Thin +_5g Accelerometer", *Analog Devices— ADXL320*, (2004),16 pages.

Matsakis, Demetrios "The Timing Group Delay (TGD) Correction and GPS Timing Basis", *Proceedings of the 63rd Annual Meeting of the Institute of Navigation*, Cambridge, MA, (Apr. 2007),6 pages.

"GPS Compass Solutions-Application vs. Accuracy", *CEACT Information Systems*, (Sep. 13, 2006),10 pages.

"ET301 GPS-UAV Developement Platform", (Jul. 12, 2006),11 pages.

Lemaire, Christophe "Surface Micromachined Sensors for Vehicle Navigation Systems", *Analog Devices, Inc.*, Retrieved from the Internet from http://www.analog.com/en/content/0,2886,764%255F800%255F8077%255F0,00.html on Dec. 25, 2007.,(Dec. 2007),4 pages.

Li, Xiaojing et al., "The Complementary Characteristics of GPS and Accelerometer in Monitoring Structural Deformation", *ION 2005 Meeting*, (2005),9 pages.

Li, Xiaojing et al., "Full-Scale Structural Monitoring Using an Integrated GPS and Accelerometer System", *University of New South Wales*, (Feb. 14, 2006),15 pages.

Lutz Bendlin, 'WorldTracker GPRS Review', Dec. 3, 2006, retrieved from the Internet on Sep. 16, 2009 <URL: http://pocketgpsworld.com/worldtrackerprs.php>.

* cited by examiner

Figure 2A

Figure 2C pocketfinder  Product Activation  104
YOUR WORLD LOCATED (1) Let's get started!  (2) New Account  (3) Service Plan  (4) Device Setup  (5) Finish

Billing Information

☐ Same as account holder information

First Name

Last Name

Address

Address 2

Zip Code  State
          California

Payment Type

○ ○ ○ ○ ○

Card Number

Exp Date

Month / Year

Payment Interval

You've selected: Premium Plan (change)

● $24.99 monthly

● $67.50 quarterly  Save 20%

● $210.00 yearly  Save 30% next

Site Credit  Privacy Policy  Terms and Conditions  © 2007 PocketFinder. All Rights Reserved

Figure 2E

| Locate by Phone - Call 972-331-1793 | | Friday, October 26, 2007 6:11 PM | Home | Log Out |

| Dashboard | Limited Users | My Account |

Account Settings

Account Holder Information ~ 114

☐ Allow Editing

First Name: John
Last Name: Smith
Email: Mike@actti.com [VALID]
Home Phone: 8006150898
Mobile Phone: 9499105698 [VERIFY]

Address 1: 4999 E. La Palma Ave.
Address 2:
City: Anaheim
State: California
Zip: 92807

Your username must be 6 characters or more in length and your password must be numerical.

Current Username:
Password:
Confirm Password:

[ SAVE ]

Contact Book ~ 116
Help Settings ~ 118
Account Billing ~ 120
Cancelling your Account ~ 122

Leave a comment or report a bug.   Site Credit   Privacy Policy   Terms and Conditions   © 2007 PocketFinder. All Rights Reserved

| Locate by Phone - Call 972-331-1793 | Friday, October 26, 2007 5:12 PM | Home | Log Out |

Dashboard     Limited Users           My Account

Little Dave

Identification Settings

Select an icon for your device.

General Device Information — 142

Device Nickname:
Little Dave

Name: (optional)
Dave

Last Name: (optional)
Smith

[ SAVE ]

Medical Profile

Missing Persons

Leave a comment or report a bug.   Site Credit   Privacy Policy   Terms and Conditions   © 2007 PocketFinder. All Rights Reserved

🕿 Locate by Phone - Call 972-331-1793

MISSING PERSON

 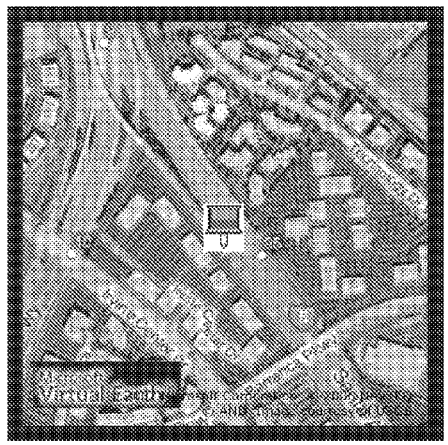

Location Last Seen: Santa Ana Frwy Irvine, United States 92618
Last Seen Wearing: Blue and white Baseball shirt
Last Seen On: 7/1/07

Description:
Name: Dave Smith
Nicknames: Little Dave
Age: 6
Gender:
Race: White
Height: 3' 8"
Weight: 65
Hair Color: Blond
Wears Glasses: N
Eye Color: Blue
Hearing Impaired: N
Birthmarks: None
Scars: None Doctor Contact Information:
Physician's Contact:
Dr. Thomson
7154454445
Medical Issues:
Notes: Bee stings. Asthmatic.

If you have any information that may help lead to the whereabouts of this person please contact:
Police Department: MS
Police Officer: Rick Ave
Phone: 744-544-3377
Case No.: None

SYSTEM AND METHOD FOR IMPROVED COMMUNICATION BANDWIDTH UTILIZATION WHEN MONITORING LOCATION INFORMATION

RELATED APPLICATION

This application is a continuation-in-part of and claims priority to U.S. patent application Ser. No. 11/935,901 filed on Nov. 06, 2007, entitled "System and Method for Creating and Managing a Personalized Web Interface for Monitoring Location Information on Individuals and Objects Using Tracking Devices", and this application further incorporates by reference and claims priority to U.S. patent application Ser. No. 11/753,979 filed on May 25, 2007, entitled "Apparatus and Method for Locating Individuals and Objects using Tracking Devices."

BACKGROUND OF THE INVENTION

1. Field of the Invention

The invention relates generally to a system and method for creation and deployment of personalized, dynamic web services to access location information on individuals and objects. More particularly, the present invention relates in one embodiment to a system for creation of a personalized, dynamic, web-interface that accesses location information of a tracking unit associated with an individual or object that uses wireless data transfer and/or wireless location and tracking systems and wireless communication system (WCS).

2. Description of Related Technology

In conventional communication systems, location information of individuals may be monitored. For instance, location information such as positional coordinates may be tracked or monitored for a variety of individuals, such as children, Alzheimer's syndrome patients, or mentally ill persons. Furthermore, location information for animals, such as cats and dogs, may be tracked using these conventional systems to locate a lost or stolen animal. In other conventional communication systems, scientists, such as zoologists, track, for example, wild animals to study and collect data related to their mating and/or nocturnal behavioral patterns.

In addition, objects are also tracked or located that use these systems. For example, merchants choose to track the location of goods as part of an inventory function and/or an anti-theft mode. In another example, police often use location-tracking systems to facilitate recovery of stolen automobiles, such as the LoJack™ vehicle recovery system offered by the LoJack Corporation of Westwood, Mass., in the United States. Automobile rental agencies often track a location of automobiles that customers rent to ensure their automobile is maintained within a contracted rental use boundary. Other location systems provided in select automobiles assist a driver navigating to a desired destination, such as the OnStar™ system offered by the OnStar Corporation of Detroit, Mich., in the United States.

Global Positioning System (GPS) technology may be incorporated in these conventional communication systems. GPS technology determines positional information of a GPS receiver based on measuring signal transfer times between satellites having known positions and the GPS receiver. The signal transfer time of a signal is proportional to a distance of a respective satellite from the GPS receiver. Consequently, the distance between the satellite and the GPS receiver can be converted, utilizing signal propagation velocity, into a respective signal transfer time. The positional information of the GPS receiver is calculated based on distance calculations from at least four satellites.

As such, GPS technology provides outdoor, line-of-sight communication between a GPS receiver and a centralized station within areas that are unobstructed by fabricated structures and natural features. Fabricated structures may include multi-story buildings, bridges, dams, and the like. Natural features include mountains, hills, valleys, canyons, cliffs, and the like. Exemplary products, such as Wherifone™ and Guardian Lion™, use GPS technology to track individuals and/or objects from a centralized monitoring station.

Conventional centralized monitoring station in many instances use a map that may be two dimensional, or even a three-dimensional, topological map that depicts landscaping, marine, or other environments. The map typically displays representative icons of individuals and/or objects being tracked. In one example, a mobile device may display the three-dimensional map, including primary regions and sub-regions that are pre-programmed to create a series of overlay maps for viewing on a computer display. In yet another example, map information of a first and second user terminal is synthesized; a map is chosen based on the map information from the database; and the map information is displayed on at least one of the first user and the second user terminal. In another GPS conventional communication example, GPS positioning information is transmitted from a GPS unit and between peripheral devices, such as between a camera and a Palm Pilot, through a local wireless communication unit or interface.

In yet another example, a location of small wireless devices on roaming objects is determined by achieving ad-hoc short range wireless connectivity between the wireless devices and communication devices such as Bluetooth enabled mobile phones that pass by, where the communication devices can be located by other means, such as GPS or network-based technologies. Other examples include a location-determining device monitors at least one automatic sensor associated with a subject. Still other alert systems include upon a child feeling endangered, a panic button is pressed to send a panic signal to tell others their location. Still another conventional system depicts a personal security device that includes a manager initiating transmission of a signal to the monitoring network when a sensor senses that the transmitter has been removed from a user. Other conventional tracking and location systems include a central monitoring station utilizing software agents to analyze information received from remote tags, and to determine an appropriate action to take with respect to that information.

According to various prior art disclosing systems such as GPS signaling, graphics, and displays associated with user interfaces, which are described below and herein incorporated by reference. Systems generally representative of the patent prior art include: U.S. Pat. No. 7,064,711 to Strickland et al. entitled "Method for Iterative Determination of Distance between Receiving Station and Transmitting Station and Also Calculating Unit and Computer Software Product" that issued Jun. 20, 2006; U.S. Pat. No. 7,065,244 to Akimov entitled "Method for Mapping a Three Dimensional Area" that issued Jun. 20, 2006; and U.S. Pat. No. 7,065,370 to Ogaki et al. entitled "Positioning Information Transmitting Device and Positioning Information Transmitting/Receiving System" that issued on Jun. 20, 2006. Other representative prior art patents describing still other GPS apparatus and methodology include: U.S. Pat. No. 7,065,348 to Aoki entitled "Communication System for Providing Information on Position of Communication Party" issued on Jun. 20, 2006; U.S. Pat. No. 7,155,238 to Katz entitled "Wireless Location Determining Device" that issued on Dec. 26, 2006; U.S. Pat. No. 7,049,957 to Watson entitled "Local Area Positioning System" that issued on May 23, 2006, and U.S. Pat. No. 6,674,368 to Hawkins et al. entitled "Automated Tracking System" that issued on Jan. 6, 2004.

Still other representative prior art patents and patent applications demonstrating additional elements of GPS systems include U.S. Pat. No. 6,998,995 to Nakajima entitled "Elevator Remote Monitoring Apparatus" that issued on Feb. 14, 2006; U.S. Pat. No. 7,038,590 to Hoffman et al. entitled "Personal Security and Tracking System" that issued on May 2, 2006; U.S. Pat. No. 7,088,252 to Weekes entitled "Systems and Apparatus for Personal Security" that issued on Aug. 8, 2006; U.S. 2006/0232449 to Gonzalez entitled "Child Alert System" that published on Oct. 19, 2006; U.S. 2002/0067256 to Kail IV entitled "Reprogrammable Remote Sensor Monitoring System" that published on Jun. 6, 2002; and U.S. Pat. No. 7,149,189 to Huntington et al. entitled "Network Data Retrieval and Filter Systems and Methods" that issued on Dec. 12, 2006. Most recently, still other representative prior art patents involving personalized services include U.S. Pat. No. 7,272,212 to Eberle et al. entitled "System and Method for the Creation and Automatic Deployment of Personalized, Dynamic and Interactive Voice Services" that issued on Sep. 18, 2007, illustrating a system and method for combining personalized information broadcast technology with an active voice page.

Still more recent patent publications in user-oriented content systems, which are herein incorporated by reference in their entirety, include U.S. 2008/0059889 published on May 6, 2008, entitled "System and Method of Overlaying and Integrating Data with Geographic Mapping Applications" by Parker et al. discloses a geographical overlap system utilizing a client/server model that streams geographic data from a server system to a dynamically render vector based map layers inside a client browser; U.S. 2008/0010585 published on Jan. 10, 2008, entitled "Visual Document User Interface System" by Hundal, et. al. discloses a document and authoring tool for generating a digital document including a plurality of content channels providing primary content continuously in a looping manner and at least one supplementary channel on a single page; U.S. 2008/0059504 published on Mar. 6, 2008, entitled "Method and System for Rendering Graphical User Interface" by Barbetta discloses a customized graphical user interface that generates a merged file that is converted into one or more executable applications for generating the customized graphical user interface; U.S. 2007/0083819 published on Apr. 12, 2007, entitled "Method and System for Generating Pyramid Fisheye Lens Detail-In-Context Presentations" by Shoemaker discloses a system for generating a presentation of a region-of-interest in an original image for display on a display screen; U.S. 2007/033531 published on Feb. 8, 2007, entitled "Method and Apparatus for Context Specific Content Delivery" by Marsh discloses a method and apparatus for generating and delivering selected primary content and contextually-related, targeted secondary content to users; U.S. 2005/0071736 published on Mar. 31, 2005, entitled "Comprehensive and Intuitive Media Collection and Management Tool" by Schneider et al. discloses a media collection and management tool for collecting, managing, and configuring media and media related properties.

In summary, the prior art provides a user limited flexibility to adjust a controlled monitoring area about an object. In addition, the prior art provides limited flexibility for a user choosing and creating custom maps for viewing and locating objects. Furthermore, the prior art has limited ability calculating positional data of objects when GPS signaling is unavailable. In addition, the prior art provides limited flexibility in providing graphical displays that better utilize available system bandwidth and/or minimizing data transfer and data overhead requirements.

Thus, what is needed are apparatus and methods for wireless data transfer and/or wireless location and tracking systems that provide additional advantages over conventional systems. These advantages would include, inter alia, calculating positional data and location coordinates of tracking devices when GPS signaling is unavailable, providing graphical displays for subscribers which aid monitoring and tracking objects and/or individuals, providing security measures when monitoring tracking devices to prevent unauthorized detection and spying on individuals, and/or improving utilization of computer bandwidth and improved mapping graphical display capabilities over conventional systems.

SUMMARY OF THE INVENTION

In a first aspect of the present invention, a method is disclosed for providing location information of an object or individual to a subscriber on a webpage in a personalized format. The method includes the steps of providing a logon entry display to a user on the webpage; the display prevents keypad entries being recorded or stored with anti-key logger technology, and provides user access to a location management dashboard module in response to detecting a successful user logon. In one embodiment, the location management dashboard module includes a listing of one or more groups of tracking devices a user is capable of monitoring associated location coordinate information. Other method steps include providing a graphic mapping module to allow a user to reuse and reorient mapping tiles for one or more groups of tracking devices from one or more mapping service providers in accordance with one or more user defined algorithms. In addition, other method steps may include an account services module in response to detecting the successful user login, the account services module comprising menu options in the personalized format to the user. In one variant, the menu options include a XML format document having a wizard menu enabling the user to navigate and enter billing information, identification settings of one or more tracking devices, and log contact information in a contact book to contact individuals. In another embodiment, the method may include the step of providing one or more alert messages associated with one or more groups of tracking devices in response to detecting a successful user login.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

BRIEF DESCRIPTION OF THE DRAWINGS

FIG. 2A illustrates a Product Activation Webpage to enter a device identification code in accordance with an embodiment of the present invention.

FIG. 2C illustrates a Product Activation Webpage to choose a service plan in accordance with an embodiment of the present invention.

FIG. 2E illustrates a Product Activation Webpage to enter payment information in accordance with an embodiment of the present invention.

FIG. 5 illustrates an Account Holder Information Webpage in accordance with an embodiment of the present invention.

FIG. 9 illustrates General Device Information Webpage for Little Dave in accordance with an embodiment of the present invention.

FIG. 11 illustrates a Contact Book Webpage in accordance with an embodiment of the present invention.

FIG. 15 illustrates a Location Management Dashboard Webpage, Alert System Module, and Acknowledge System Module associated with the Family Members represented by Icons of Little Dave, Mom, Dad, and Spaz in accordance with an embodiment the present invention.

FIG. 21 illustrates a Missing Person Flyer associated with Little Dave in FIG. 9 in accordance with an embodiment of the present invention.

Figure 1:
FIG. 1 is a Location and Tracking Service Webpage in accordance with an embodiment of the present invention.

Table 1 illustrates a partial listing of an FLA File that integrates graphical mapping tiles from Virtual Earth, Google, and Yahoo for use with the Location Dashboard Display Module in accordance with an embodiment of the present invention.

DETAILED DESCRIPTION

Reference is now made to the drawings wherein like numerals refer to like parts throughout.

As used herein, the terms "location coordinates" refer without limitation to any set or partial set of integer, real and/or complex location data or information such as longitudinal, latitudinal, and elevational positional coordinates.

As used herein, the terms "tracking device" refers to without limitation to any integrated circuit (IC), chip, chip set, system-on-a-chip, microwave integrated circuit (MIC), Monolithic Microwave Integrated Circuit (MMIC), low noise amplifier, power amplifier, transceiver, receiver, transmitter and Application Specific Integrated Circuit (ASIC) that may be constructed and/or fabricated. The chip or IC may be constructed ("fabricated") on a small rectangle (a "die") cut from, for example, a Silicon (or special applications, Sapphire), Gallium Arsenide, or Indium Phosphide wafer. The IC may be classified, for example, into analogue, digital, or hybrid (both analogue and digital on the same chip and/or analog-to-digital converter). Digital integrated circuits may contain anything from one to millions of logic gates, invertors, and, or, nand, and nor gates, flipflops, multiplexors, etc. on a few square millimeters. The small size of these circuits allows high speed, low power dissipation, and reduced manufacturing cost compared with board-level integration.

As used herein, the terms "wireless data transfer", "wireless tracking and location system", "positioning system," or "wireless positioning system" refers to without limitation to any wireless system that transfers and/or determines location coordinates using one or more devices, such as Global Positioning System (GPS). The terms "Global Positioning System" refer to without limitation any services, methods, or devices that utilize GPS technology that determine a position of a GPS receiver based on measuring signal transfer times between satellites having known positions and the GPS receiver. The signal transfer time for a signal is proportional to a distance of the respective satellite from the GPS receiver. The distance between the satellite and the GPS receiver may be converted, utilizing signal propagation velocity, into the respective signal transfer time. The positional information of the GPS receiver is calculated based on distance calculations from at least four satellites.

As used herein, the terms "AGPS", "Assisted GPS", or "A-GPS", refers to without limitation any services, methods, or devices that utilizes an assistance server to help reduce required time to determine a location using GPS (such as in urban areas, when the user is located in "urban canyons", under heavy tree cover, or even indoors.) The development of AGPS is fuelled, in part, by the U.S. Federal Communications Commission's E911 to have location coordinates of a mobile device available to emergency call dispatchers. In A-GPS networks, the receiver, has limited processing power and normally under less than ideal locations for position fixing, and communicates with the assistance server that has high processing power and access to a reference network. Since the A-GPS receiver and the Assistance Server share tasks, it provides a capability to provide more efficient location tracking capability than regular GPS, and improved cellular coverage.

As used herein, the terms "wireless communication system" refers to, without limitation, any system that uses communication stations and a wireless location means for determining positional coordinates such as Global Positioning Radio Service (GPRS).

As used herein, the term "network" refers to, without limitation, any telecommunications network, data network, or Voice Over IP (VOIP) network, satellite, radio, microwave, millimeter-wave, RF wireless, RF cable, optical, and networking protocols (such as IEEE 802.11g), transmission media, and communications connections any combinations thereof As used herein, the term "server" refers to, without limitation, any computer element that stores or transfers data, information, or computer applications between one or more computer devices, mobile phones, laptop computers, user computer terminal, or the like, utilizing a network.

As used herein, the term "module" refers to, without limitation, any software sequence or hardware configuration, executable code, XML programming language code, Flash mapping code, Macromedia/Adobe Flash vector-graphics file format, FLA mapping programming code sequence, SWF files, SWF programming code sequence, SWF Action Script Files, Internet Browser Loadable Script files, Action Script files, AJAX-based (Asynchronous JavaScript and XML) API web mapping codes, SVG (Scalable Vector Graphics), dynamically rendered vector-based points, software code sequence, software program, software executable code, firmware, hardware unit, or the like.

Overview

In one salient feature, the present invention discloses a location tracking method and system, to provide a web interface to display location information associated with tracking devices, back-end systems, and to direct monitoring, displaying, and calculating, inter alia, location coordinates of a tracking device. In one embodiment, the system generates a personalized user profile to organize, control, and store location of one or more tracking devices associated with one or more groups of objects or individuals. The personalized user profile may include one or more user selectable icons (or upload picture (e.g., JPEG or GIF)) icons to monitor on a map display. Upon successful user logon authentication, the system performs a status check and generates one or more alert messages associated with one or more groups of tracking devices to display on a location management dashboard module. A location management dashboard module depicts a listing of one or more groups of tracking devices capable of a user monitoring or requesting monitoring information. One or more wizard menus prompts a user to enter or update personal information, generate or update entries a contact book, and request information associated with past or current status of one or more groups of tracking devices. In another embodiment, if location coordinates of a tracking device (in one or more groups) violates one or more rules defined by a subscriber of the system, the subscriber (or a designated guardian or representative or individuals in a contact book) may be notified through, for example, wireless telephone, plain old telephone system (POTS), Internet, text message, email, vibration, sound, voice, or the like. A graphical mapping module is disclosed to provide mapping tiles from multiple mapping service providers in response to user request for location information of a tracking device associated with an object or an individual. A wizard menu enables the user to reorient an initial request for mapping tiles in a different layout or view format without requiring access to a mapping service provider website. Alert messages associated with the tracking device are generated in accordance with selected coverage zones and dashboard management tools are included in a complied file that is readily accessible by user requests for zooming in and out functionality Broadly, the present invention generally provides a system and method for monitoring, locating and tracking an individual or an object. The system produced according to the present invention may find beneficial use for locating and tracking people, such as missing, lost, or abducted persons, Alzheimer's syndrome patients, or mentally ill persons. The system may also be useful for locating and tracking animals. Additionally, objects, such as vehicles, goods, and merchandise may be located and tracked with the system produced by the present invention. Although the following discussion may use lost or abducted child as an exemplary demonstration, it is to be understood that this discussion is not limiting and that the present invention may be used in other suitable applications.

Exemplary Systems

Referring now to FIGS. 1-32 and exemplary embodiments of the tracking and monitoring system of the invention described in detail. It will be appreciated that while described primarily in the context of tracking individuals or objects, at least portions of the apparatus and methods described herein may be used in other applications, for example, without limitation, user personal profiles to monitor components such as transducers, sensors, and electrical and/or optical components as the components pass through an assembly line process.

Moreover, it will be recognized that the present invention may find utility beyond purely tracking and monitoring concerns. For example, the "tracking device" and "user selected coverage zones" described subsequently herein may conceivably be utilized to improve displaying and monitoring applications to achieve increased computational efficiency and accuracy of calculated quantities. The calculated quantities may include object velocity (traveling during an assembly process) to determine which process portions are running efficiently and which portions may require improvements or modifications. Other functions might include monitor and track properties of electronic module assembly (e.g., display of electrical properties and measurement parameters during testing and/or operations before, during, or after wireless module completion, and so forth). Myriad of other functions will be recognized by those of ordinary skill in the art given the present disclosure.

Product Activation

Figure 2B:
FIG. 2B illustrates a Product Activation Webpage to enter New Account information (which will be verified before using as a notification method) in accordance with an embodiment of the present invention.
Figure 2C:
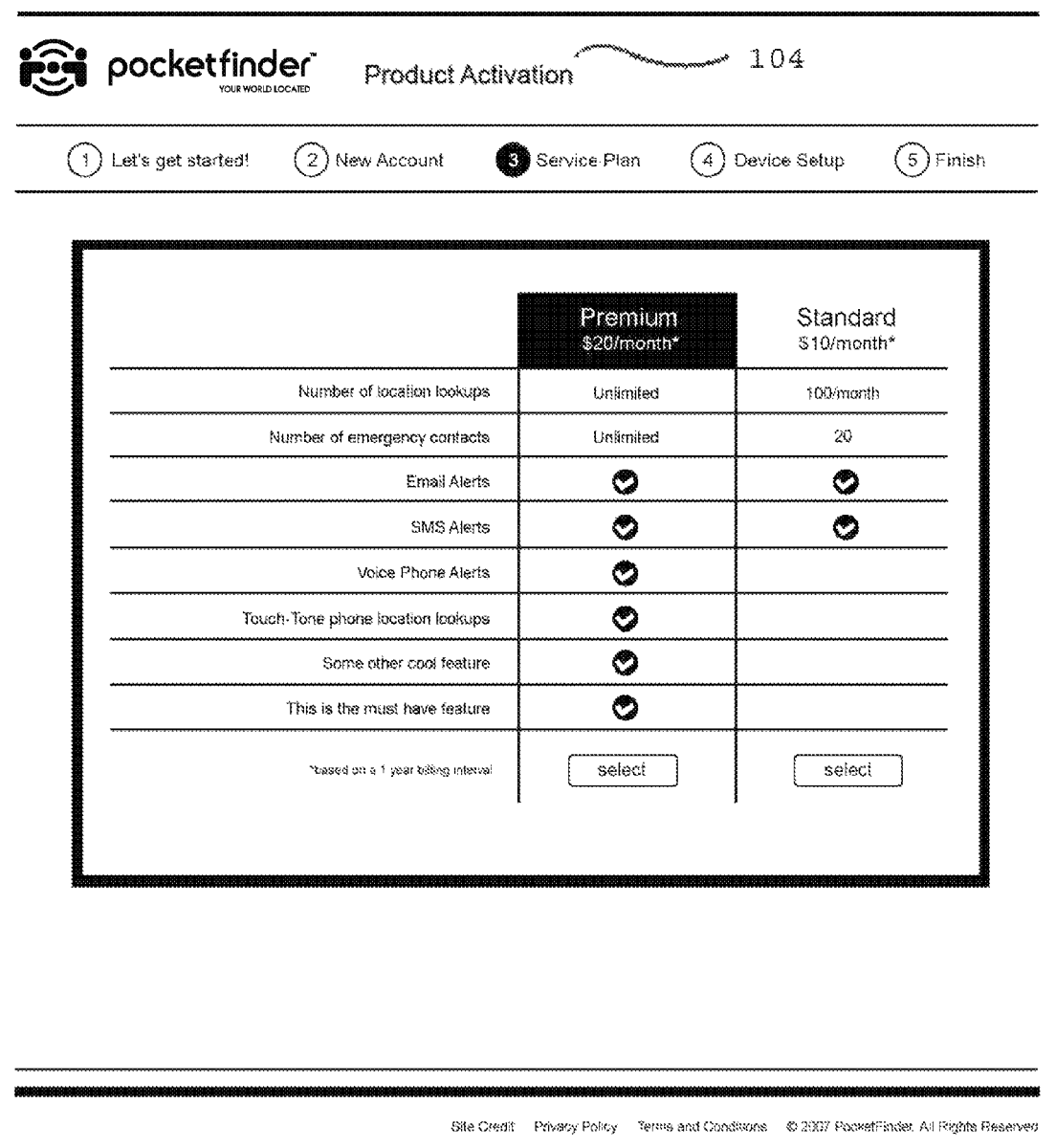
Figure 2D:
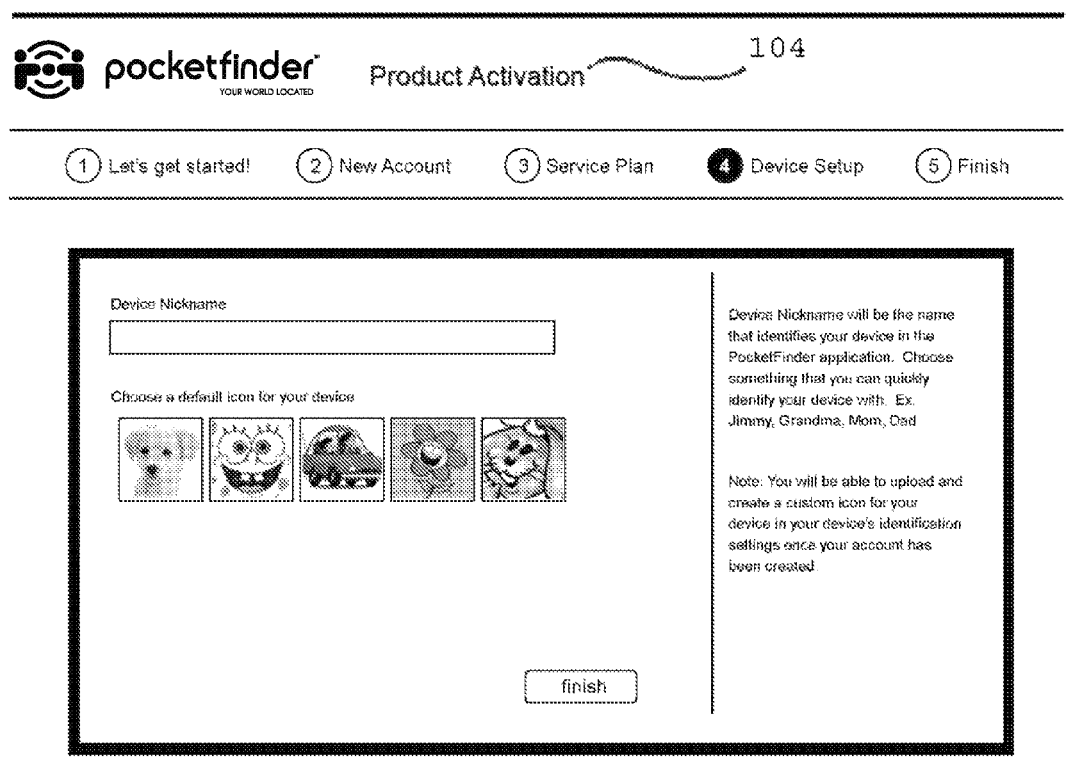
FIG. 2D illustrates a Product Activation Webpage to enter a device nickname in accordance with an embodiment of the present invention.
Figure 2F:
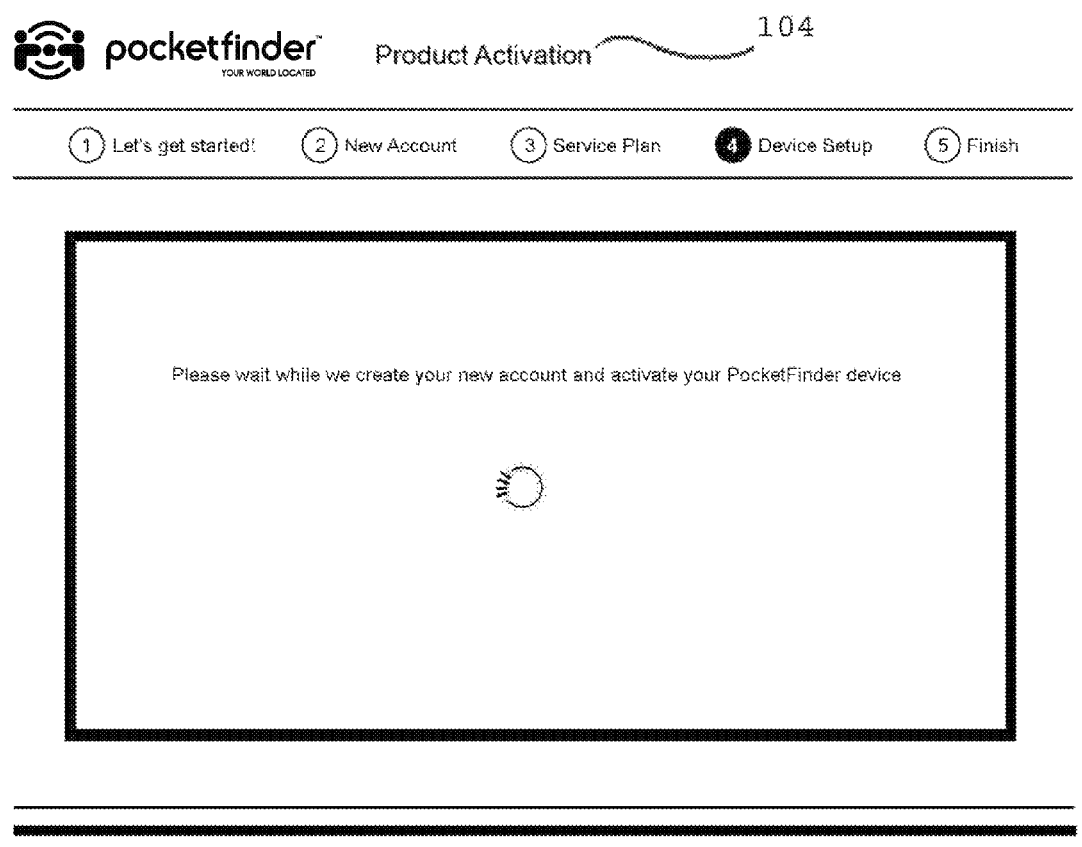
FIG. 2F illustrates a Product Activation Webpage to create a new account and activate your Pocketfinder Device in accordance with an embodiment of the present invention.
Figure 2G:
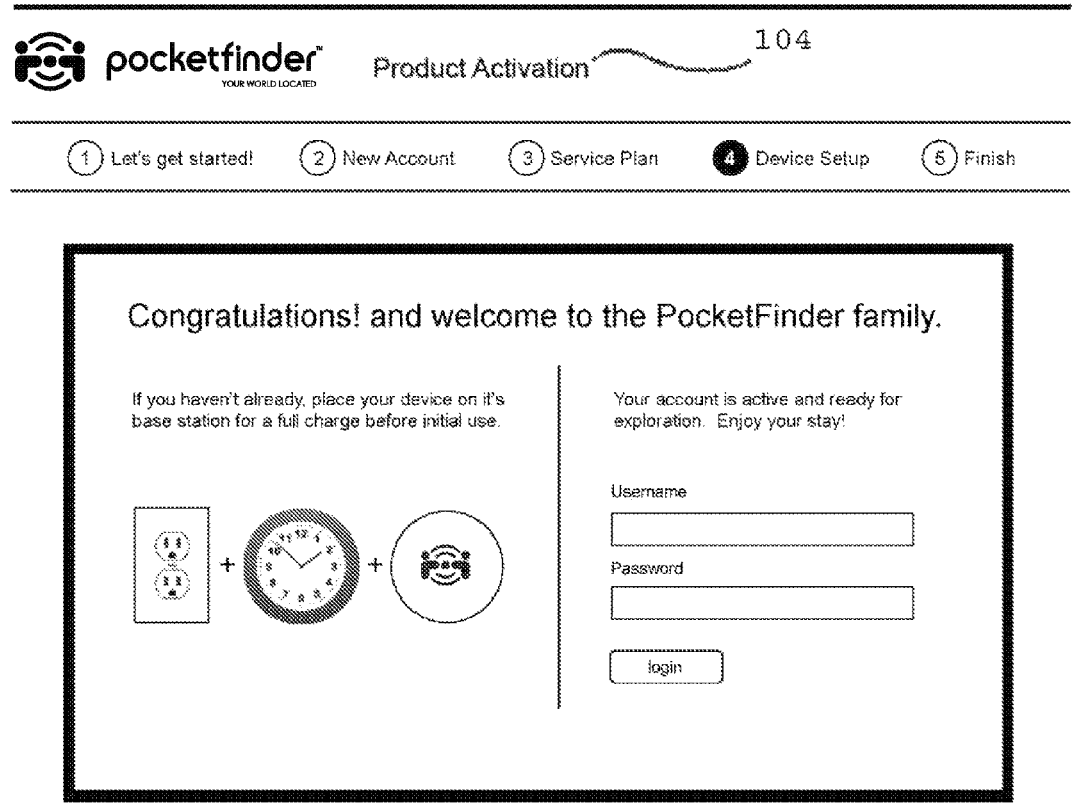
FIG. 2G illustrates a Product Activation Webpage to enter user name and password and to request place your device on its base station for a full charge in accordance with an embodiment of the present invention.

Referring to FIG. 1, a user (e.g., subscriber of the pocketfinder service) accesses a home page of a location and tracking service 100. The pocketfinder service may be activated 104 for a tracking device 102 as well as provide user access to account services that are part of the location and tracking service. Referring to FIG. 2A, device identification code is requested as well as other information including username, password, and current email address. In one embodiment, a subscriber may add an additional device, e.g., new device, to your existing account. Referring to FIG. 2B, New Account wizard menu makes a request for subscriber contact information. In one exemplary embodiment, the New Account wizard menu instructs a subscriber that a mobile phone number, e.g., included as part of the subscriber contact information, will need to be verified in your account settings once you've completed activation before being used as a notification method, e.g., for alert messages of one or more tracking devices. Referring to FIG. 2C, a wizard menu illustrates features, e.g., Premium vs. Standard, as well as monthly price information of the location and tracking service 100. Referring to FIG. 2D, device nickname is requested to allow a subscriber to quickly identify a device, e.g., Jimmy, Grandma, Mom, and Dad. Referring to FIGS. 2E and 2F illustrate billing options and activation wait menu of the location and tracking service 100. Referring to FIG. 2G, a user is requested to place their tracking device 102 on a base station to charge its battery level.

Service Login

Figure 3:
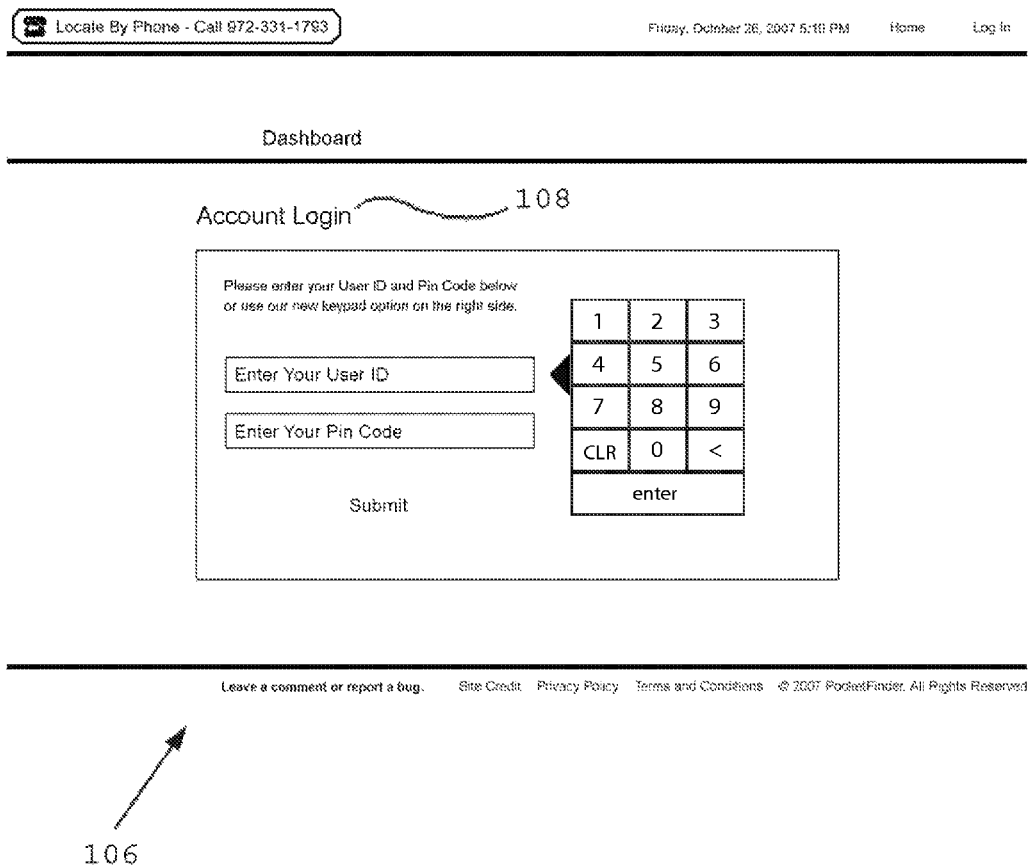
FIG. 3 illustrates an Account Logon Webpage in accordance with an embodiment of the present invention.

Referring to FIG. 3, a user receives access to logon module 106. In one example, logon module 106 incldes logon entry display (e.g., account login 108). In one embodiment, the logon entry display accepts numbers and letters (see FIG. 14). In this example, a user enters a name and password (e.g., user id and pin code) into the account login 108. In one variant, anti-key logger technology protects entries including a name and password. In one embodiment, account login 108 on an Internet website utilizes a similar account login on a telephone unit, e.g., mobile communication unit, because both utilize, in one example, the same (or substantially similar) user id and pin code.

My Account

Figure 4:
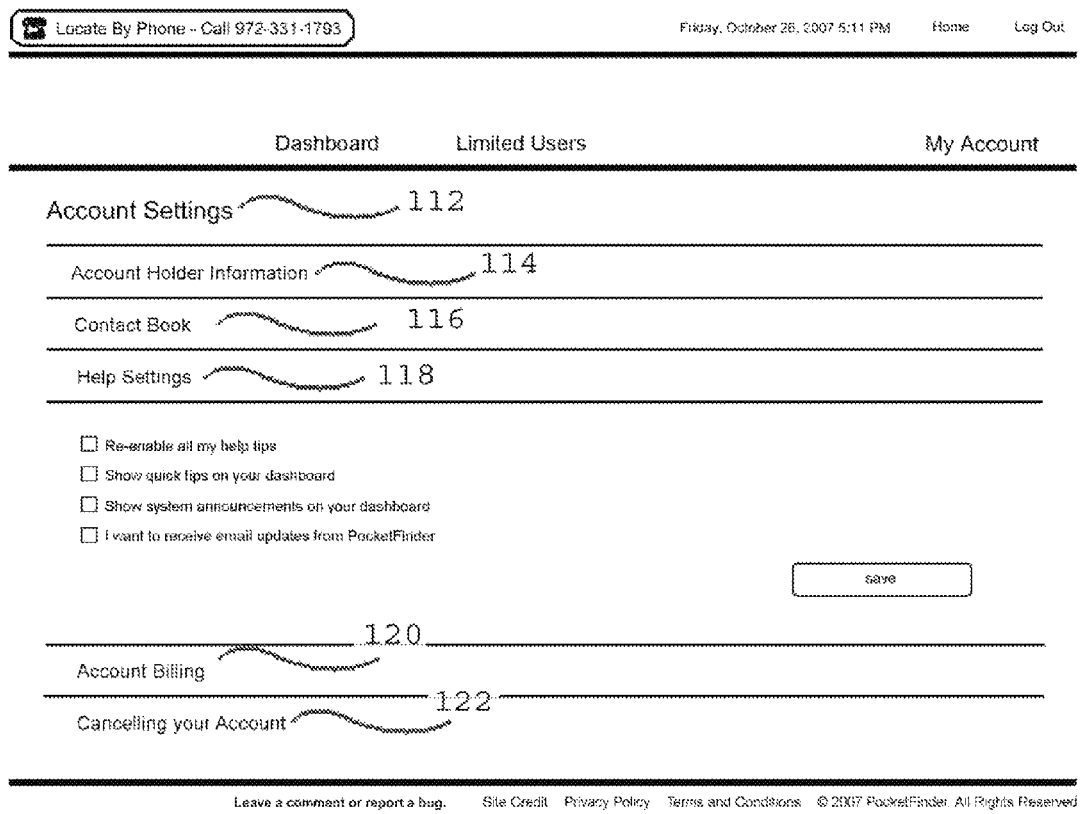
FIG. 4 illustrates a Help Settings Webpage in accordance with an embodiment of the present invention.
Figure 6:
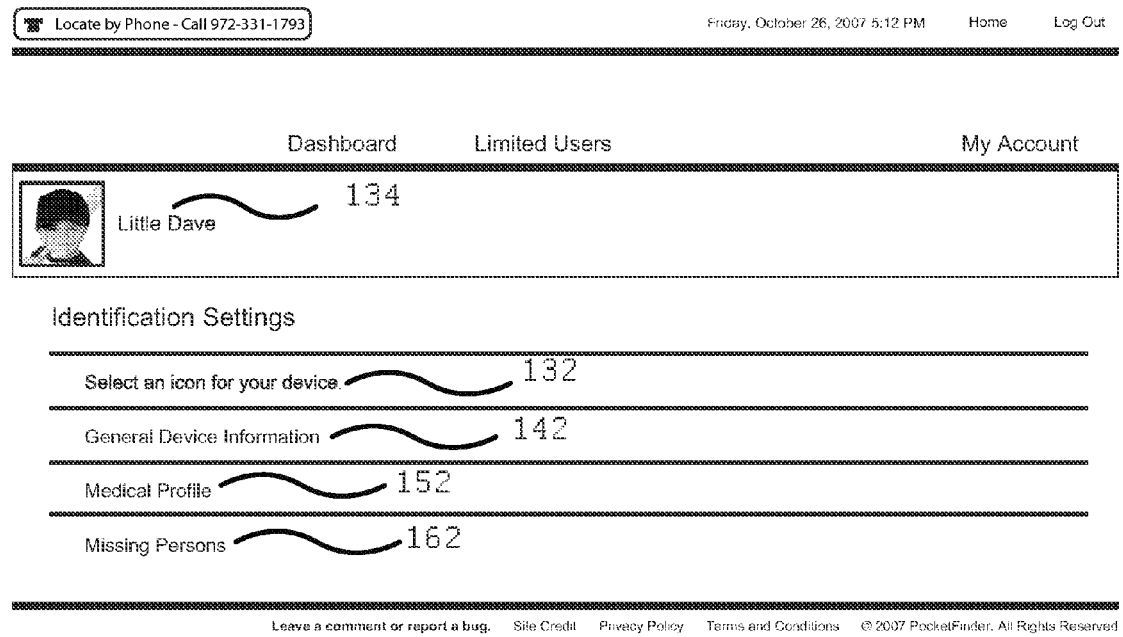
FIG. 6 illustrates an Identification Settings Webpage of a tracking device represented by Icon of Little Dave in accordance with an embodiment of the present invention.
Figure 7:
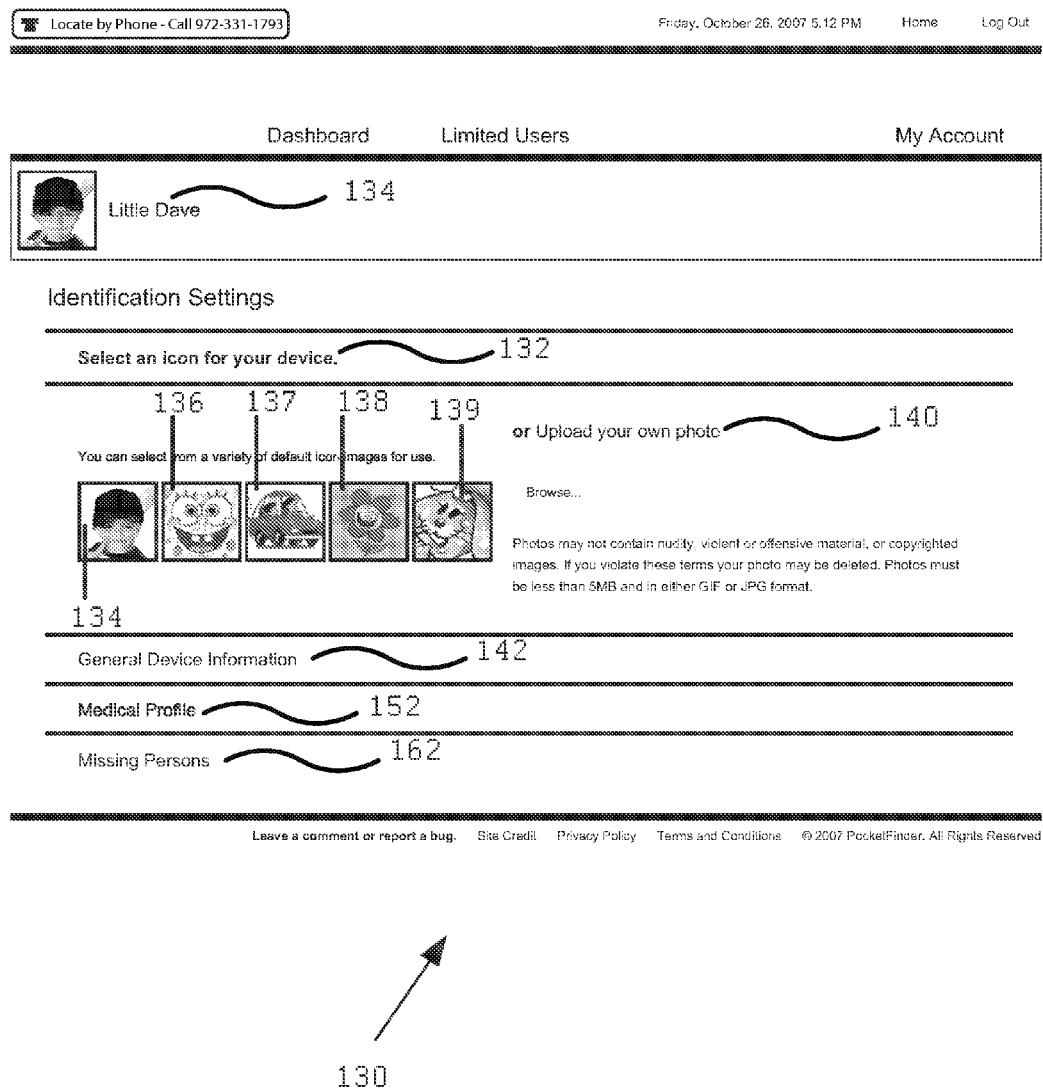
FIG. 7 illustrates an Identification Settings Webpage to select an Icon to represent a Tracking Device in accordance with an embodiment of the present invention.

Referring to FIG. 4, after successful authentication of a user id and pin code, a user accesses account services module (e.g., my account 110). Account services module (e.g., my account 110) generates a user profile (e.g., account settings 112) of building blocks, e.g., elements, to organize user profile contents and structure (e.g., account holder information 114, contact book 116, help settings 118, account billing 120, and cancelling your account 122). The user profile, in one embodiment, requests location information on a tracking device 102. According to one embodiment, mark-up language (XML) constructs account services module 110. Upon authentication of a user id and pin code, a user proceeds to account holder information module 114. Referring to FIG. 5, a user enters identification information (into account holder information module 114), for instance, first name, last name, address 1, email, city, password, home phone number, mobile phone number, zip code, and email address(es). Advantageously, a user may utilize the same user profile (e.g., account settings 112) for location and tracking requests using a telephone or mobile phone or using a computer terminal (and logging on to a pocketfinder webpage). In another embodiment, a user may choose a different user profile responsive to a format or type of wireless or wired device. Available pull down module menus include contact book 116, help settings 118, account billing 120, and cancelling your account 120.

Identification

Figure 8:
FIG. 8 illustrates a Medical Profile Webpage to input Medical Data for Little Dave in accordance with an embodiment of the present invention.

Referring to FIGS. 6-10, a user provides values for device identification module 127. In device identification module 127, a user, for instance, chooses one of a list of icons to represent one or more tracking devices associated with an individual, object, or animal. In one example, the list of icons includes default icon images (e.g., 134, 136, 137, 138, and 139) or (in one variant) a personnel icon, e.g., a photo in JPEG or PDF format file 140 may be uploaded. In one embodiment, device specific information may be entered. For instance, device specific information for Little Dave 134 may include medical profile module 152 (as shown in FIG. 8), including: birthday, blood type, allergic medications, medical conditions, and physician's name and phone number. To further personalize tracking device parameters in device identification module 127, general device information 142 is inputted for one or more tracking device in one or more groups including: device nickname, first name, and last name (as shown in FIG. 9).

Contact Book

Figure 11:
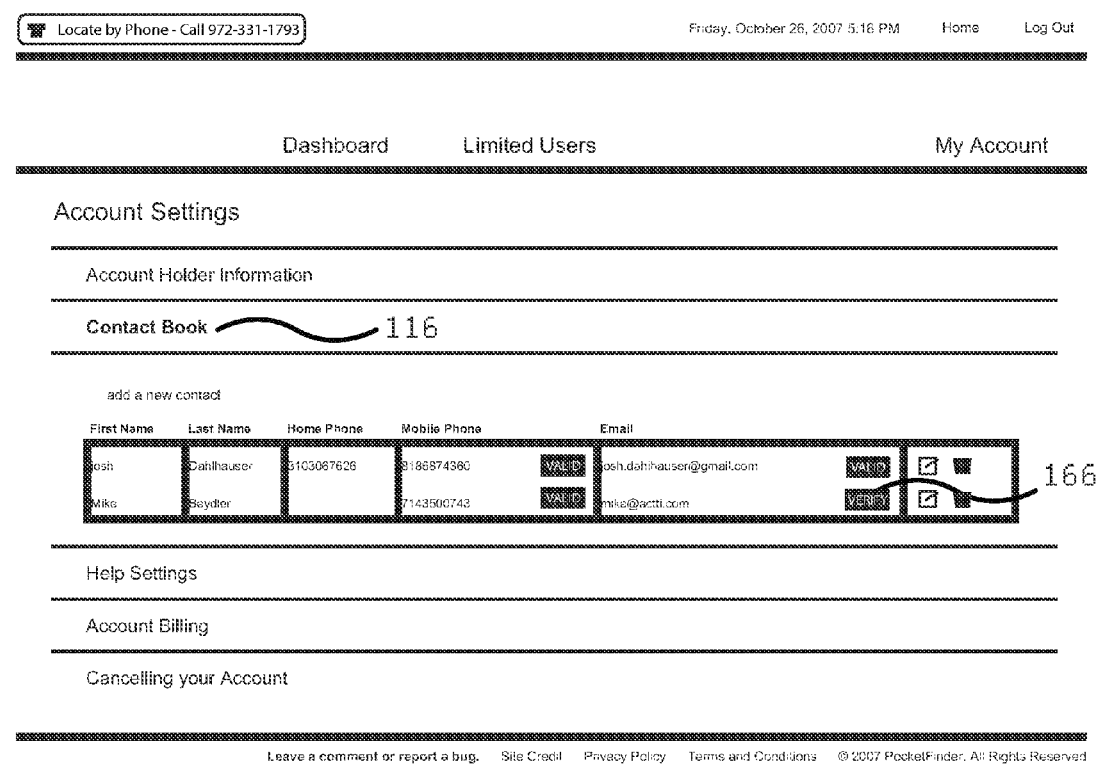

Referring to FIG. 11, a user enters values into contact book module 116. The values define contact information, e.g., first name, last name, home phone number, mobile number, and email address. To verify entered values, a return email, for example, generates automatically to request value validation (e.g., verify 166) of entries input into contact book module 116.

Limited Access

Figure 12:
FIG. 12 illustrates a Limited Access Users Webpage in accordance with an embodiment of the present invention.
Figure 13:
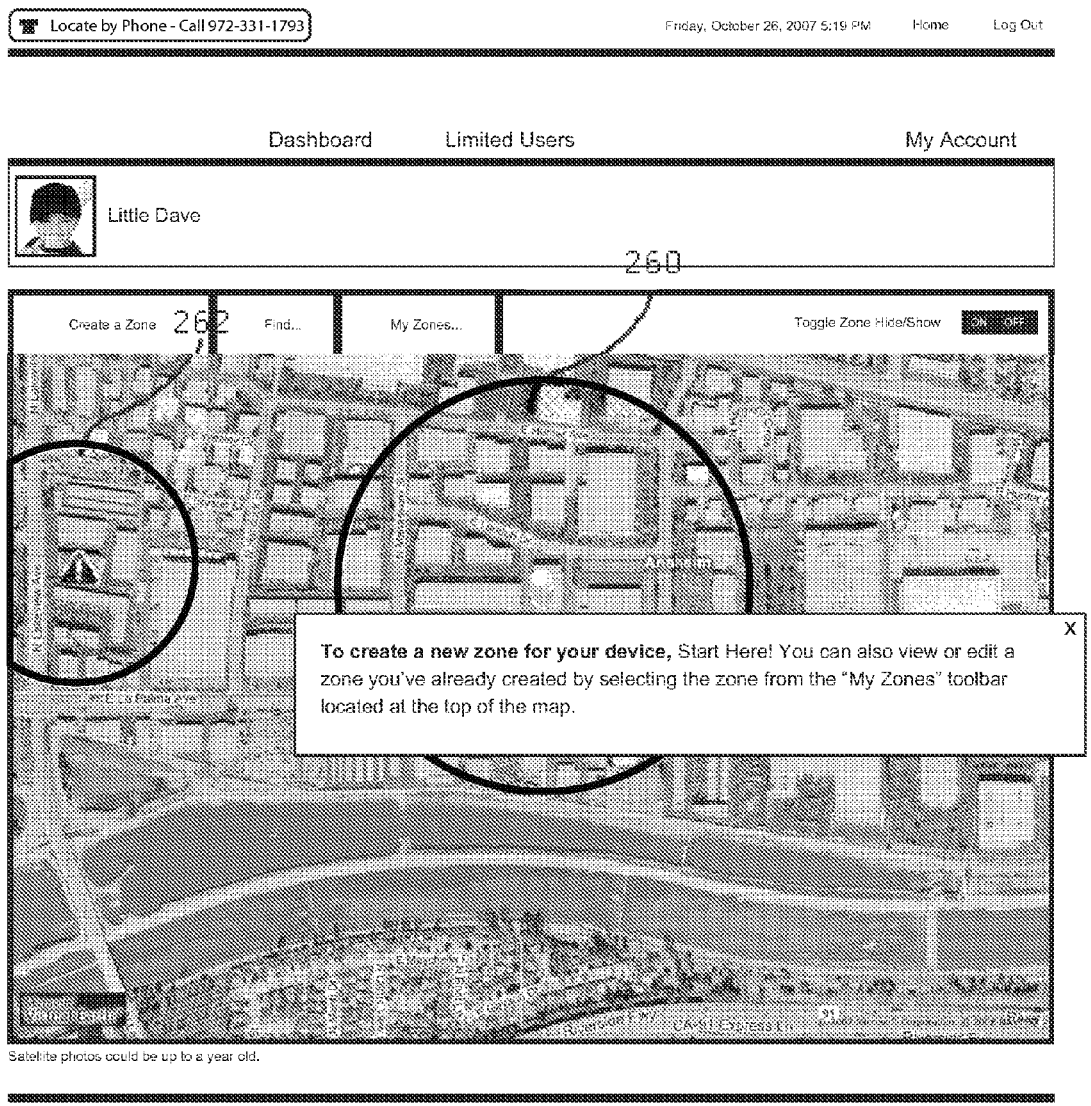
FIG. 13 illustrates a Map having User Selected Coverage Zones in accordance with an embodiment of the present invention.

Referring to FIG. 12, a wizard menu provides user access to enter information for limited access user's module 170. More specifically, temporary or limited access to tracking device particulars may be extended on a limited user basis. In one embodiment, the limited user basis may be assigned on a per device basis. For instance, a limited user basis may include assigning a list of limited access users to one or more of the following devices (check-box icon display menus 172, 174 ... the newly created user will be able to see the location of the following checked devices. Don't worry access can always be modified anytime by you).

Location Management Dashboard

Figure 10:
FIG. 10 illustrates a Device Speed Limit Webpage for Little Dave in accordance with an embodiment of the present invention.
Figure 14:
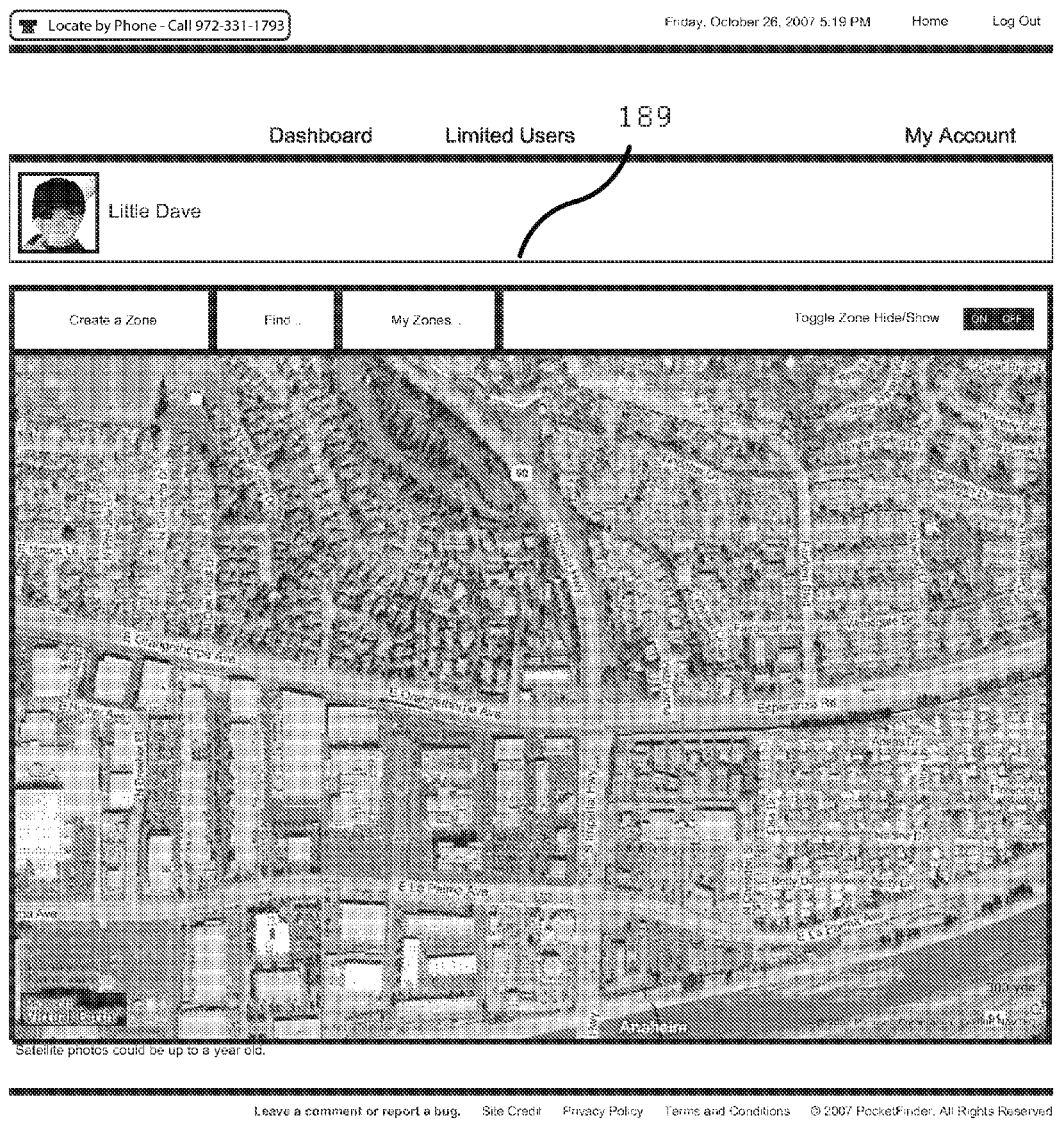
FIG. 14 illustrates a Map for creating User Selected Coverage Zones in accordance with an embodiment of the present invention.
Figure 15:
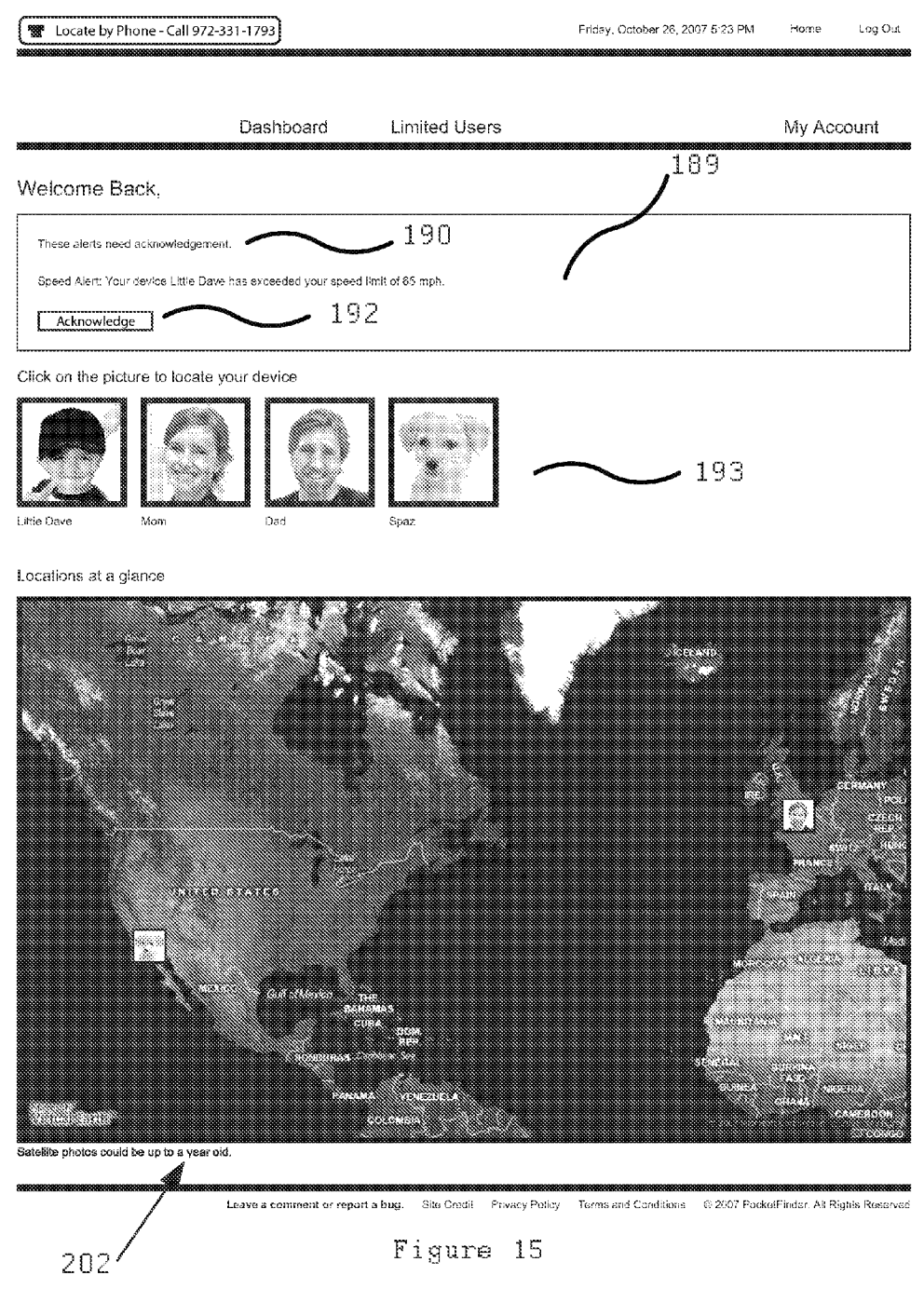

Referring to FIGS. 13-19, representative menus are depicted for location management dashboard module 189. FIG. 12 illustrates two user defined coverage zones 262, 260 for Little Dave. FIG. 14 illustrates an overall street map to locate Little Dave. FIG. 15 depicts location management dashboard module 189 having a family account module 193. The family account module 193 includes family members (e.g., Little Dave, Mom, Dad, and Spaz). In one embodiment, the system prompts a subscriber (user) of alerts (e.g., alert messages) that need acknowledgement (e.g., acknowledge 192). The alert messages (e.g., speed alert 190) include, for example, a breach condition (e.g., defined by a user or a system administrator such as a maximum speed limit or distance from a freeway entrance or exit) associated with one or more icons, dangerous locations, or dangerous surroundings proximal to an individual or object having a tracking device 102 (e.g., Little Dave, Mom, Dad, and Spaz) as shown in FIG. 10.

Alert

In one embodiment, upon successful acknowledgement of a subscriber log on, alert messages (see FIG. 15) automatically populate the location management dashboard 189. Alert messages may be selected or inputted by, for example, a subscriber or system administrator and may include one or more warnings (or illustrative warning messages that may increase/decrease in intensity) to indicate a dangerous condition, a security breach, or the like, for a tracking device, such as tracking device 102. In one embodiment, an alert message generates when a tracking device (in the group) indicates a breach condition, e.g., battery is disconnected from a tracking device. In one embodiment, an alert message generates upon detection of a cut wire in a tracking device. In one variant, an alert message generates when a vehicle (including an individual or object having a tracking device) exceeds a specified speed limit (see FIG. 15). In one embodiment, when a battery temperature exceeds a specified temperature, the system communicates a signal to the tracking device to temporarily power down for a specified cooling period. In another embodiment, upon battery charge level falling below a specified level, an alert message communicates to shut down or reduce power consumption of a tracking device. In one variant of this embodiment, an individual having a tracking device receives, in one example, an indication, e.g., an audio sound or voice command, to locate a power charging unit. In another embodiment, a designated individual in contact book 116 may be contacted upon detection of a breach condition, e.g., violation of a user defined system policy, by a tracking device. In another embodiment, the pocketfinder service 100 may send, for example, communicate an audible or vibrate signal to the tracking device to locate a base unit responsive to a battery charge level, e.g., and provide signaling to a tracking device to enter a designated battery charging mode, such as a quick charge and/or trickle charge.

Mapping

Figure 16:
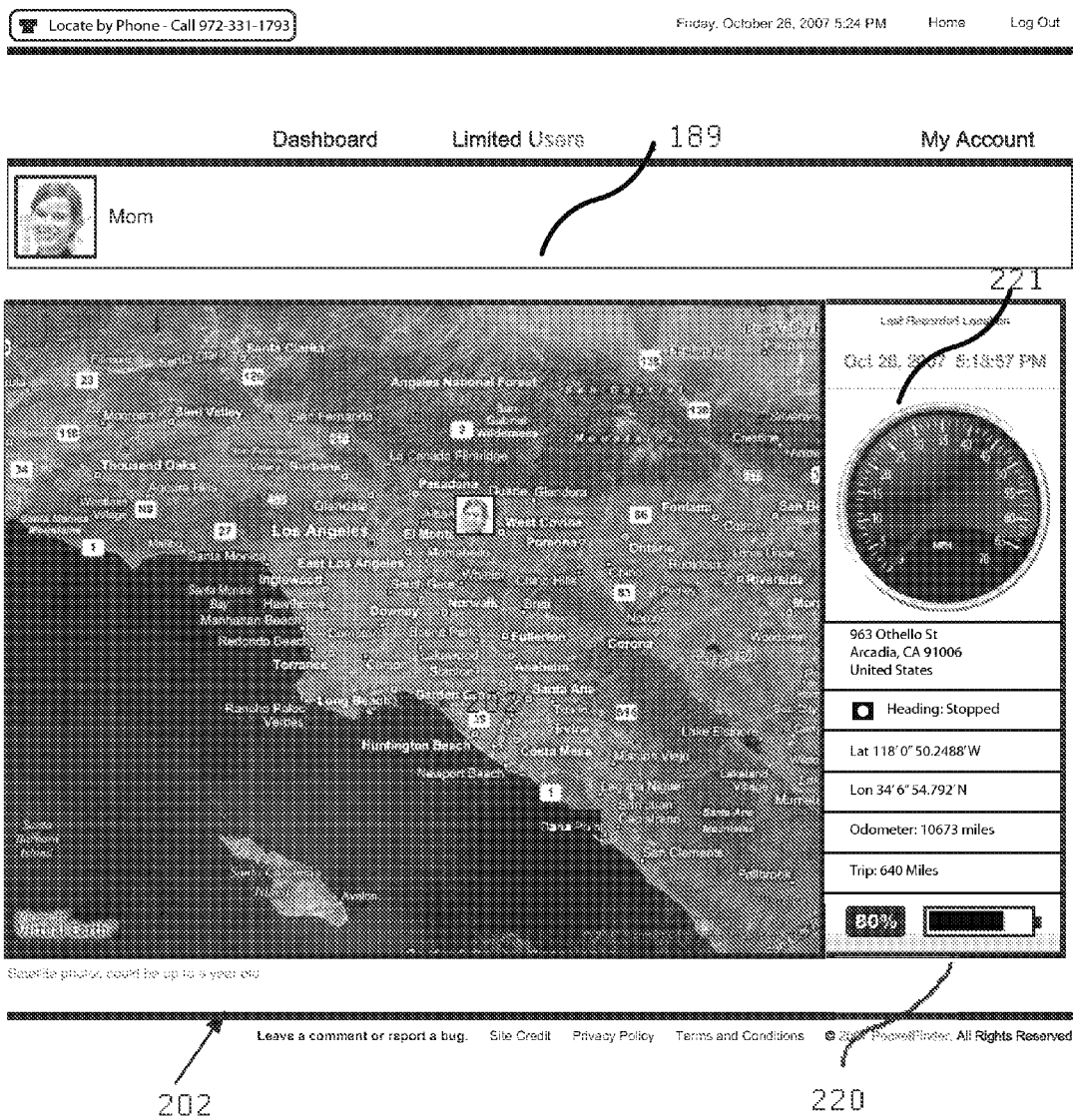
FIG. 16 illustrates a Location Management Dashboard Webpage associated with Mom including Location Coordinates, Battery Management Module, and Velocity Display Module in accordance with an embodiment of the present invention.
Figure 17:
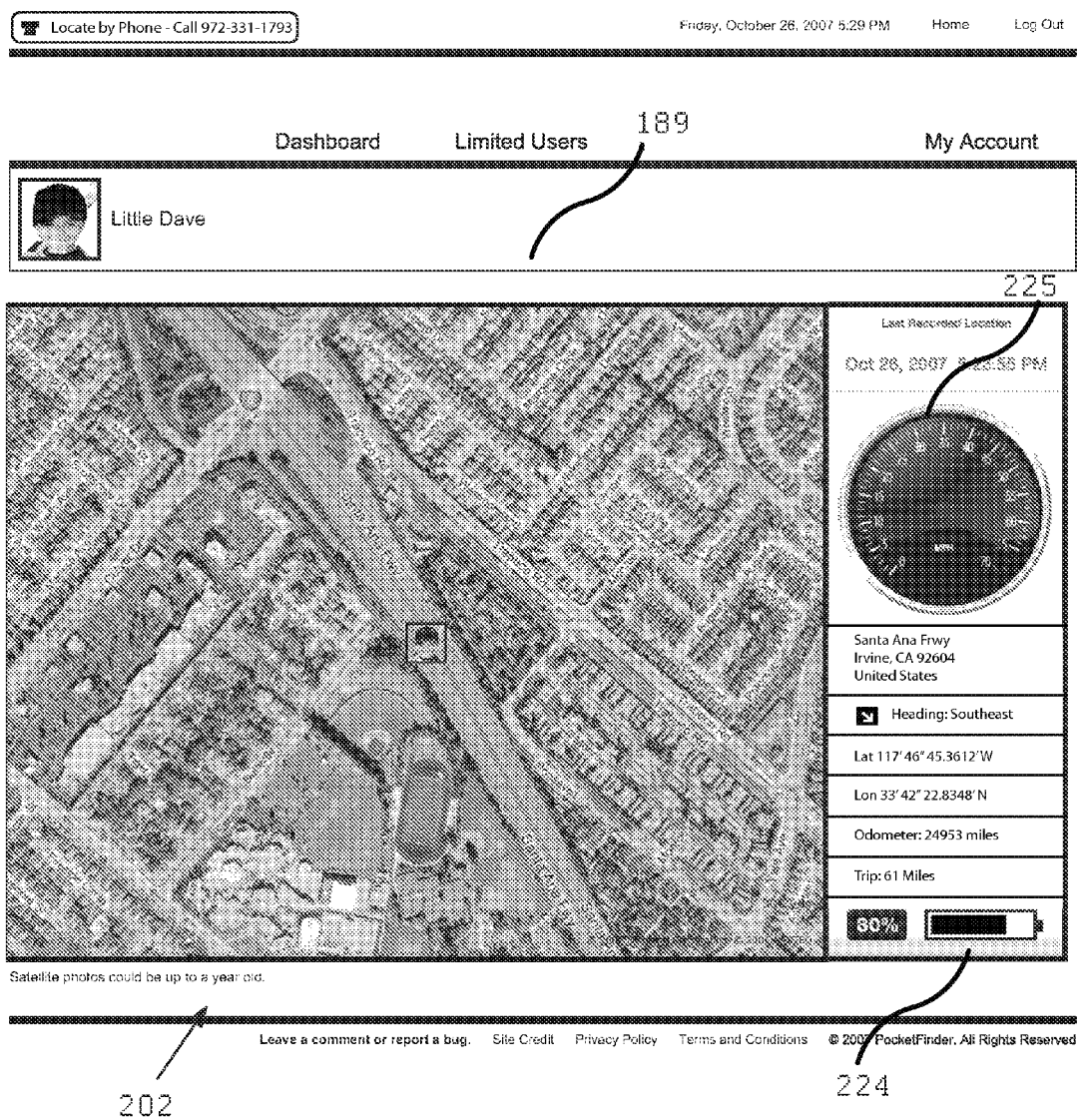
FIG. 17 illustrates a Location Management Dashboard Webpage associated with Little Dave including: Location Coordinates, Battery Management Module, and Velocity Display Module in accordance with an embodiment of the present invention.

Referring to FIG. 15, a mapping module 202 depicts, for example, location of an object (e.g., Spaz) or an individual (e.g., Dad), using the pocketfinder device. Referring to FIGS. 16-17, a mapping module 202 indicates proximal to a mapping area representative icons, e.g., velocity indication devices (e.g., speedometers 221, 225) to indicate instantaneous speed of an individual (e.g., Mom or Little Dave equipped with a tracking device, such as tracking device 102). Other information provided with the mapping area may include location coordinates, e.g., latitude, longitude, odometer reading, and trip miles.

Referring to FIG. 10, a user selects a device speed setting (e.g., set you maximum speed: 65) 180 for Little Dave. An alert message 190 generates, for instance as shown in FIG. 15, if Little Dave exceeds a speed limit of 65 miles per hour (e.g., a breach condition). The alert message 190 may require one or more notification methods including: email 182 (e.g., Mike@actti.com), short message service (SMS) 184, or voice 186. In one variant, the alert message 190 may be provided to one or more persons in, for instance, information contained in contact book 116, in an event that an acknowledgement is not received (e.g., within a specified interval) by a first alert message recipient, e.g., Mike@actti.com.

In one user defined situation, an alert message may be generated when Little Dave exceeds a specified distance from a specified set of location coordinates. Furthermore, individuals in contact book 116 may be notified in accordance with, for instance, recognition of a breach condition. In one embodiment, the breach condition may be in accordance with one or more user defined criteria. In another embodiment, a breach condition may result from an occurrence of one or more (e.g., user) specified events.

For instance, the user defined criteria may include: notification to an individual in contact book 116 having a closest stored address to a last known or current address of the tracking device 102 requesting, for instance, a positive acknowledgement to an outgoing alert message, notification based on oldest to youngest family member, last contacted individual known available from contact book 116, or the like. The happening of one or more specified events may include notification of another individual in the contact book 116 upon multiple failed requests for a first recipient to acknowledge receipt of an alert message.

In contrast to many conventional location and tracking devices, such as RFID, a tracking device of the present invention advantageously provides capability of nationwide and global location coordinates monitoring and tracking of persons or objects. Advantageously, the present invention being a multi-format location and tracking service may utilize a multitude of devices (e.g., desktop computer, laptop computer, land-line phone, mobile phone, personal digital assistant, or the like, because it does not utilize a specialized data format; thus, this service does not require a specialized data reader, e.g., RFID reader, to read data. Furthermore, unlike other conventional identification systems, the service provided by the present invention does not require a tracking device, such as tracking device 102, being physically constrained within a specified distance to be read by a reader, e.g., a RFID reader.

Furthermore, the service of the present invention being in XML format provides a universal format so location coordinates may be readily communicated (e.g., via Bluetooth) between various computer and personal assistant formats such as a laptop computer and a wireless device, such as a mobile phone. Consequently, the service depicted by the present invention either semi-automatically or automatically adjusts to a software platform or Internet Browser including Safari 3.5 software. In addition, an identification code may be regenerated for a tracking device (on a periodic basis or upon occurrence of a security breach as discussed previously incorporated by reference U.S. patent application Ser. No. 11/753, 979 filed on May 25, 2007, whereas RFID devices have a security code that is preprogrammed and (once cracked), all RFID devices having the security code are vulnerable to unauthorized detection.

To understand methodology of the service 100 (e.g., location and tracking device interface) of the present invention, an exemplary example of its use is discussed supra. In this example, a user provides a request signal to obtain location coordinates of a first tracking device. The first tracking device provides a first reply signal that comprises a first identification code to identify the tracking device. The location coordinates are displayed of the first tracking device to the user in response to the request signal. A second tracking device of one or more groups of tracking devices has a second transceiver to receive the first reply signal, compare the first identification code to a stored identification code, and communicate to a monitoring station a second reply signal. The second reply signal comprises the location coordinates of the first tracking device in part responsive to verification of the first identification code.

Coverage Zone

Figure 18:
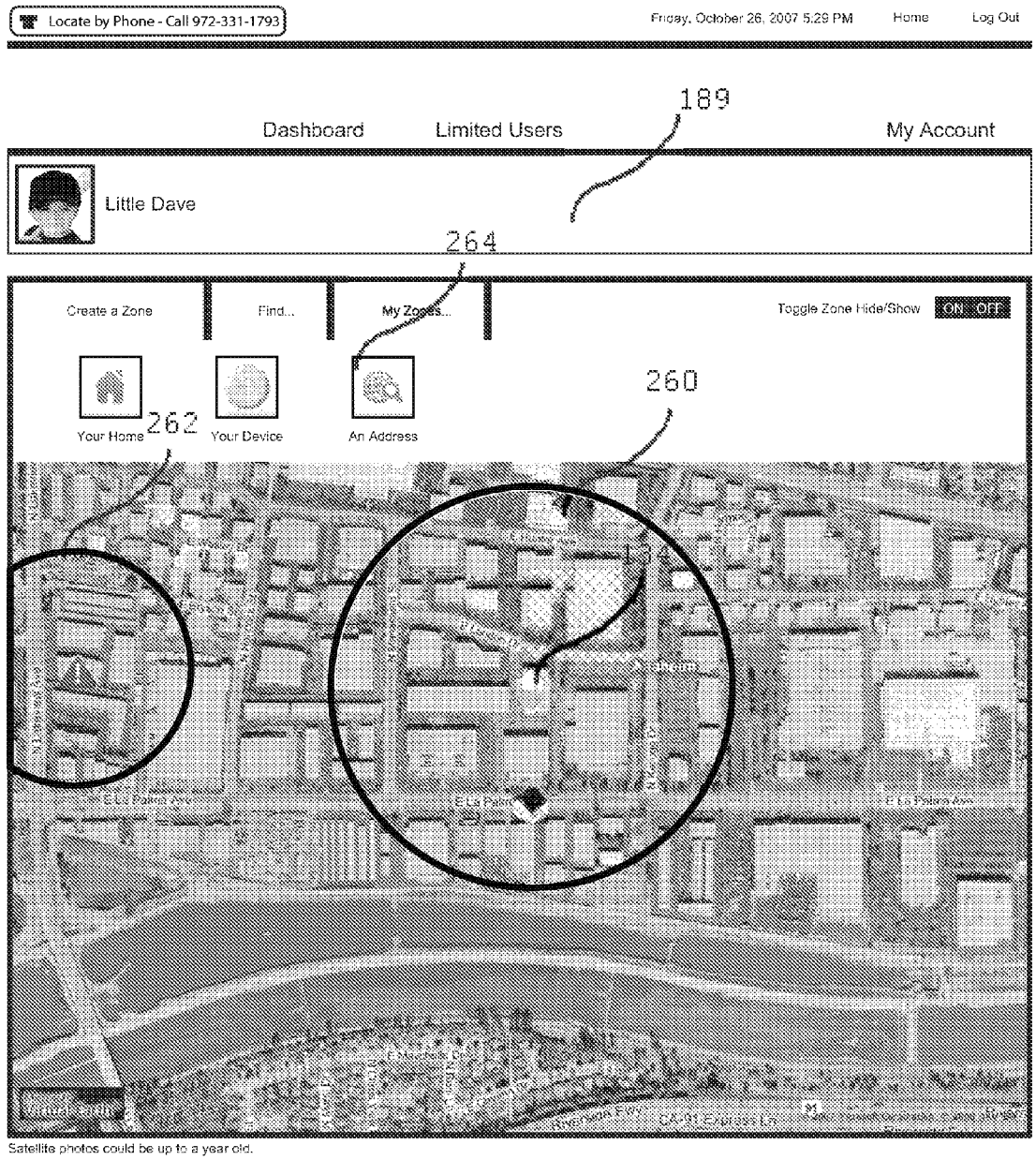
FIG. 18 illustrates a Location Management Dashboard Webpage including User Selected Coverage Zones associated with Little Dave and selectable user menus to obtain location information relative to Your Home, Your Device, and An Address in accordance with an embodiment of the present invention.
Figure 19:
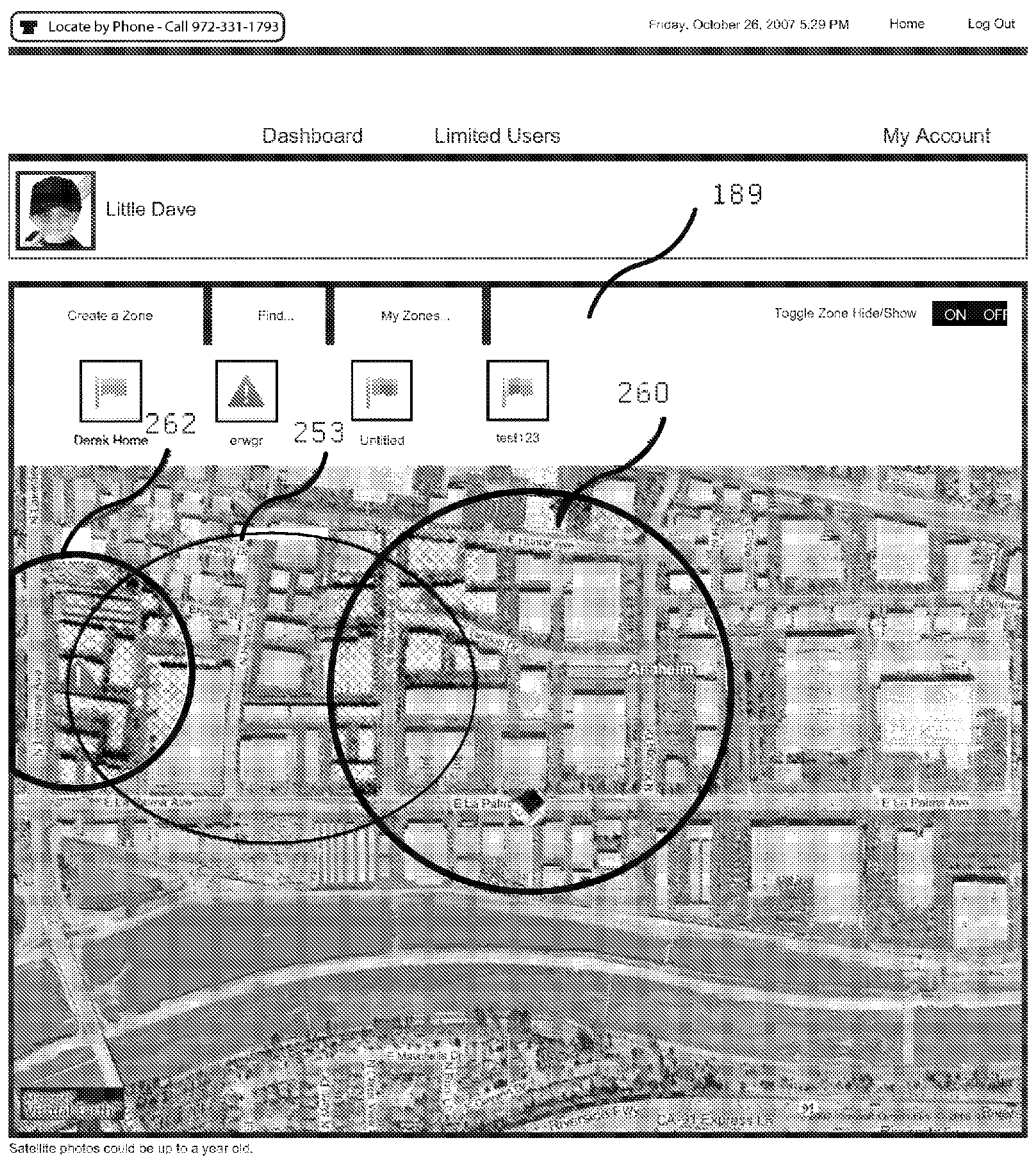
FIG. 19 illustrates a Location Management Dashboard Webpage including User Overlapping Coverage Zones associated with Little Dave and selectable user menus to obtain location information relative to Derek Home, enwgr, Untitled, and test 123 in accordance with an embodiment of the present invention.

Referring to FIGS. 18-19, user provides entries using a keyboard and/or mouse to generate a coverage zone module 258. The entries may include monitor and zone attributes, for instance, on a satellite map. In this example, the map depicts location coordinates of Little Dave 134 as well as relative physical location to other landmarks (e.g., your home) or street addresses on the map (e.g., E. La Palma Ave). In this same embodiment, the one or more management zones (e.g., safe zone 260 and unsafe zone 262) set safety and danger attributes of the service 100. These safety and danger attributes are utilized to notify individuals in contact book 116 relative to a user selectable notification process. A user selectable notification process may include transmission (and return receipt or acknowledgement) by one or more telecommunication services, e.g., SMS text messaging, cell phone (IVR), landline phone, email, and IM (Instant Messaging) as shown in FIG. 10.

With regards to zones of coverage (e.g., unsafe zone 262, safe zone 260), a user modifies or deletes one or more of these at one or more periodic (in one variant, one or more a periodic) intervals. In one variant, zones of coverage may be automatically generated and deleted. In one embodiment, one or more overlapping user defined coverage zones (e.g., created by coverage zone 253 that overlaps zones 260 and 262 shown in FIG. 19) may designate, for instance, a relative distance and/or region, for instance, a safe zone 260 and an unsafe zone 262. In one variant, a relative distance may be communicated to a user of a proximal location of a tracking device 102 to a perimeter of a safe zone 260 or unsafe zone 262. In one embodiment, a relative location coordinate error margin between the safety zone 260 and the unsafe zone 262 prevents a false alert being generated and communicated to a user.

Referring to FIG. 18, the coverage zone module 258 may utilize a smart interactive service module 264. A smart interactive service module 264 allows a user to utilize quick search features to set-up coverage zones. For instance, smart interactive service module 264 includes quick physical address lookup, quick home address locate, or quick locate unit options, e.g., where a stored or partially stored portion of these values provide improved, more efficient access to desired location information. A coverage map automatically tracks positional coordinates of a tracking device 102. In particular, a coverage map automatically repositions tracking device location coordinates, e.g., centrally locates for viewing, in response to a user's inputs utilizing quick look-up features, e.g., such as quick physical address lookup).

Missing Persons Report

Figure 20:
FIG. 20 illustrates Missing Persons Webpage information associated with Little Dave in accordance with an embodiment of the present invention.

Upon failure to locate Little Dave (cannot be found using the pocketfinder service), a missing person's report 278 is automatically prepared (see FIG. 20). The report includes, for example, print Missing Flyer 280 (including Little Dave's physical description as shown in FIG. 21). The missing person's report 278 may be submitted to authorities, e.g., Police Department, or individuals in contact book 116 in accordance with instructions provided by a user, e.g., closest individual to a last known address of Little Dave, oldest family member or other user defined criteria previously defined in above embodiments.

Battery Conservation

If a tracking device 102 looses contact with a monitoring station, a battery management module (e.g., represented graphically by battery icons 220 (for Mom) and 240 (for Little Dave) in FIGS. 16, 17, respectively), in one embodiment, places the tracking device in a low power mode to conserve power, e.g., during a mobile communication dead zone or no transmission zone. In one variant, the battery management module may maintain a lower power mode of a battery of a specified tracking device (e.g., Mom or Little Dave) until a later specified interval (upon which mobile communication may be possible) to conserve battery life. In one example, a user commands other pocketfinder devices, e.g., tracking devices such as Mom or Dad, to communicate last or current location coordinate information of a lost pocketfinder device, e.g., Spaz or Little Dave. In another embodiment, a user may turn-off power of a tracking device suspected of being monitored by unauthorized individuals (e.g., initiate tracking device cloaking option).

In another embodiment, an expanded cellular network is created by pocketfinder devices having proximate location coordinates, e.g., nearby devices generate relative tracking location coordinates between each other or a central monitoring station to increase a monitoring range of a tracking device. Consequently, in the expanded cellular network, a momentary loss of communication, a communication dead zone, between one and more tracking device has the capability of not thwarting monitoring of the tracking device.

In another embodiment, upon a user loosing connectivity with a tracking device, the user waits until another specified period to power-on (e.g., provide operational power to the tracking device) before monitoring; thus, the tracking device battery power is conserved when occupying a communication dead zone. In another embodiment, the tracking device bursts location coordinates (at specified intervals) to conserve tracking device battery life (allowing the tracking device to power-off or move to a low-power level). In another embodiment, a safety zone of the tracking device indicates when a tracking device is detected proximal to an area of a known criminal or sex offender.

Exemplary Methods

Figure 22:
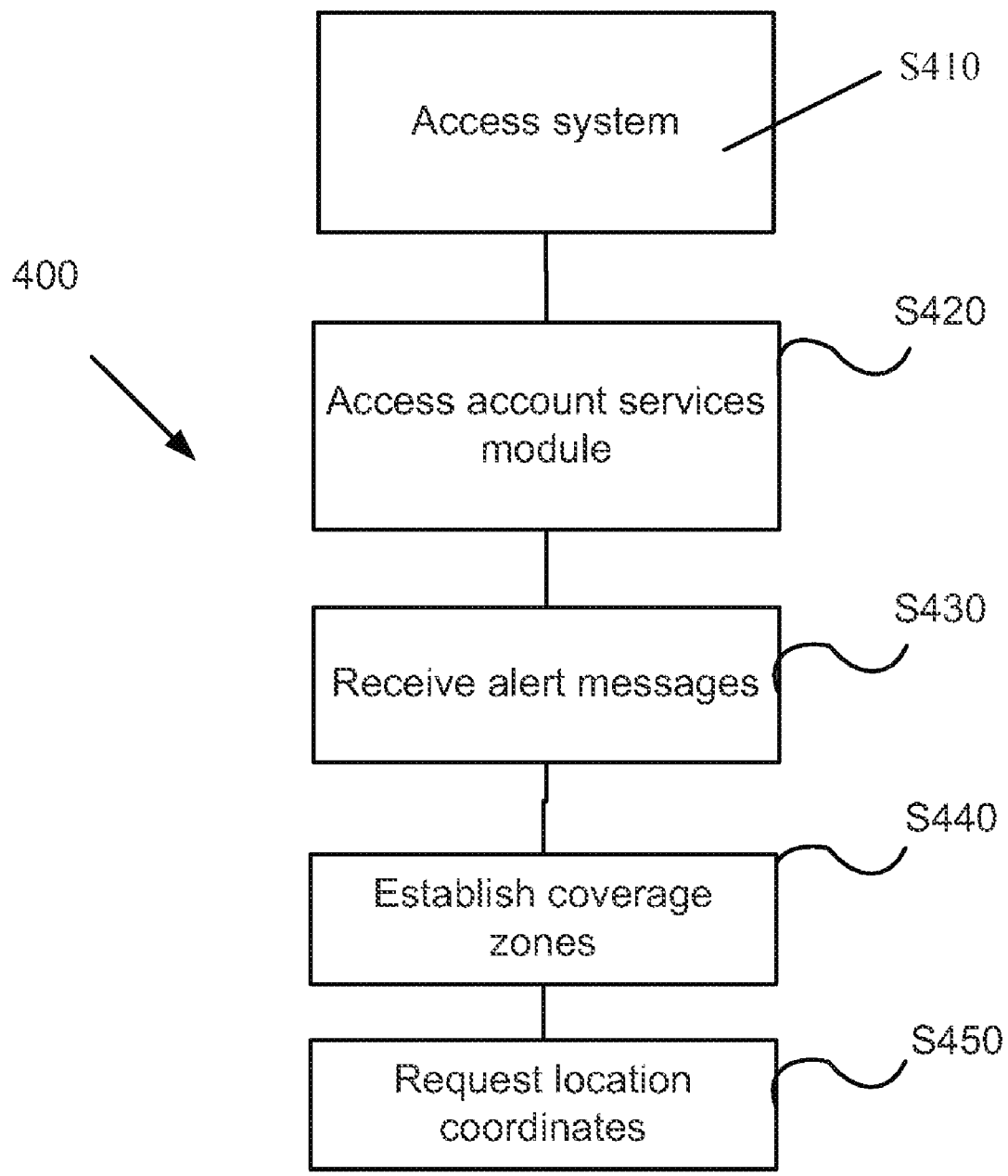
FIG. 22 illustrates a Flow Chart to create a Location and Tracking Service Webpage in accordance with an embodiment of the present invention.

Referring to FIG. 22, a flow chart (400) illustrates generation of a personalized user profile of one embodiment of the present invention. In step 410, a user accesses the location and tracking system 100. In step 420, the user accesses an account services module 110. In step 430, the user receives alert messages of tracking devices in a group 193. In steps 440 and 445, the user establishes coverage zones (e.g., 253, 260, and 262) for tracking devices in the group 193. In step 450, the user request location coordinates of one or more tracking devices in the group 193.

Mapping Application Overview

Figure 23:
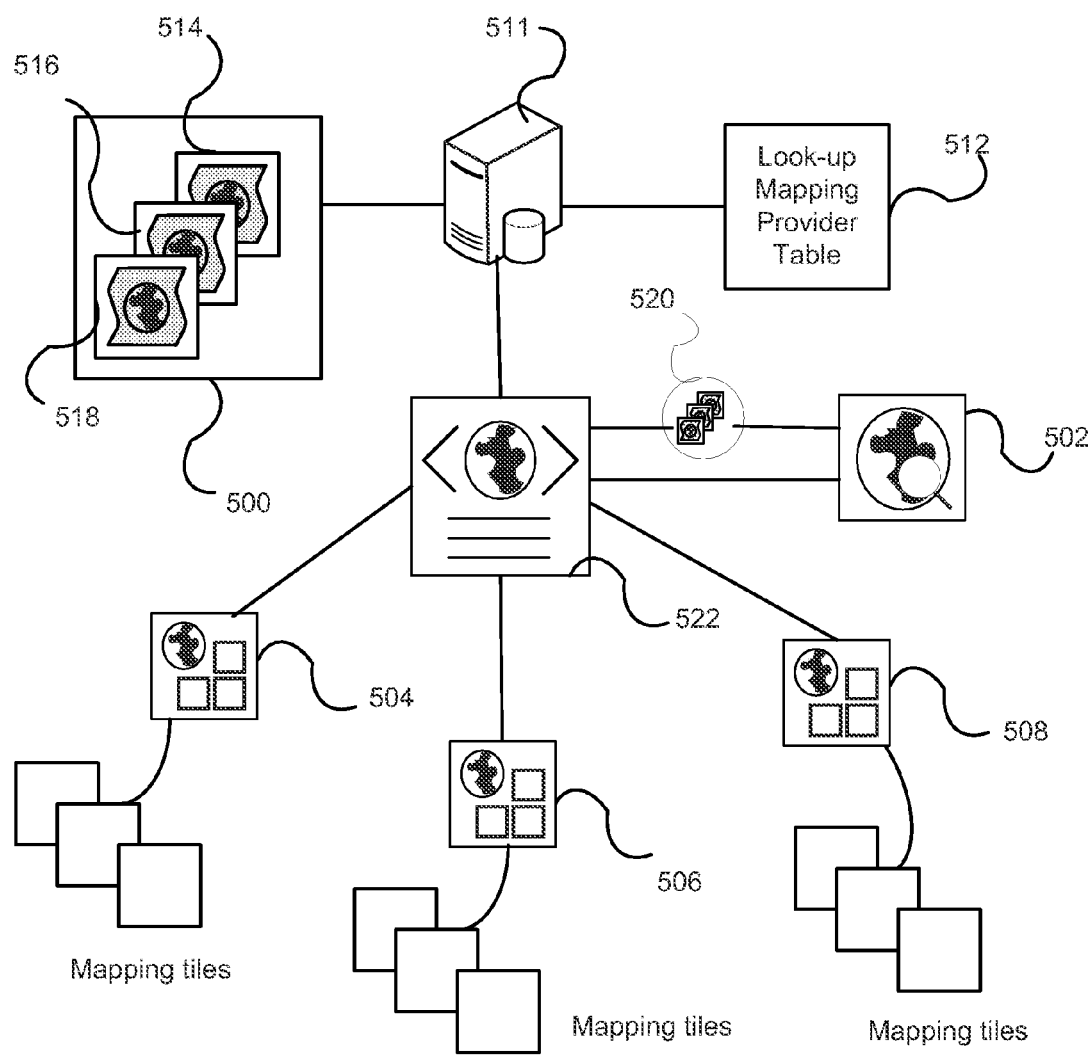
FIG. 23 illustrates a Location and Tracking Service System illustrating mapping tile inputs and database acquisition principles in accordance with an embodiment of the present invention.

Referring to FIG. 23, module 500 includes a location coordinate mapping application. In one exemplary embodiment, module 500 as disclosed below is a Flash Location Coordinate Mapping Application that integrates viewable geographical mapping tiles (e.g., location coordinate mapping tiles or mapping tiles) from one or more geographic mapping service providers. In one embodiment, module 500 integrates viewable location coordinate mapping tiles from one or more mapping service providers, e.g., which may be Google 504, Yahoo 506, and Virtual Earth 508, into a seamlessly dynamic interactive user display that may be accessible by location management dashboard module 189 (as shown, for instance, in FIG. 15). In one embodiment, module 500 advantageously switches between one or more sources of mapping service providers substantially seamlessly and substantially with little or no user awareness or user knowledge and/or user inputs. As a consequence of the switching (e.g., virtual switching), user advantageously receives tiles from one or more sources of mapping service providers in an efficient manner.

In one embodiment, receipt of and source of mapping tiles is in accordance with requested information, features, or map details custom tailored to their individual (or group) mapping needs. For instance, module 500 monitors a user's account, e.g., which may be incorporated as part of look-up mapping service provider table 512, and determined if overspent, for instance, for one or more mapping service providers, e.g., a user billing account may be over-budget with a first mapping service provider. In this embodiment, module 500 automatically switches to another account, e.g., a user billing account that is under budget or underutilized with a second mapping service provider. User billing account information accesses pocketfinder server/database 511. In one instance, pocketfinder server/database 511 incorporates look-up mapping service provider table 512 (including user billing account information) and module 500. In another embodiment, the user billing account information may be part of or associated with an overlay object in an FLA file, as shown in Table 1, which may be downloaded to a user's Internet browser 502.

In one embodiment, module 500 switches between mapping service providers web services, e.g., 504, 506, 508, to maintain location coordinate coverage in an event that a chosen mapping service provider has lost service (e.g., power outage within a city or city block where the provider is located) and another provider is available (e.g., mapping service provider 504 is down for scheduled maintenance or updating satellite mapping capability and mapping service provider 506 has current mapping tiles).

In one variant, module 500 using look-up mapping service provider table 512, which is updated on a regular or semi-periodic basis, determines from which mapping service provider one or more groups of mapping tiles include more robust mapping features (e.g., recently updated geographical satellite mapping was zoomed in and zoomed out). In one embodiment, after recent mapping updating, second mapping service provider 506 may more fully meet a user's coordinate information needs than a current, e.g., first mapping service provider. For example, a second mapping service provider may have better mapping coverage along the West Coast of North America than a first mapping service provider coverage based mainly in the East Coast of North America. Furthermore, a second mapping service provider may be, for instance, currently updating their mapping service tile(s) and be momentarily inaccessible (temporarily even though total website outages are rare) while a first mapping service provider may be currently available; thus, user's location coordinate request switched between mapping service providers maintains substantially, continuous contact with location coordinate information of a tracking device.

In another embodiment, first mapping service provider may be over-utilized (over capacity) during a portion of the day, e.g., rush hour. Accordingly, module 500 redirects user mapping service requests to an underutilized mapping service provider, e.g., switches user requests between mapping service providers based on, for instance, mapping service provider website uptime, internet access speed, and available internet bandwidth. In another embodiment, module 500 reduces a number of flash mapping tile hits when a user zooms into and out of one or more mapping tiles because, in many cases, an initial or single mapping tile request may meet a user's mapping needs, e.g., meeting subsequent and additional user requested information.

In one embodiment, using Adobe Flash CS3 action script coding and XML device stream, a request for tracking device location information including dashboard management module 189 controls, e.g., zoom-in, zoom-out, compass functionality, mapping directionality and panning functionality, are, in instance stored in pocketfinder server/database 511 (a database and/or a server) and/or partially resident on a user's Internet Browser 502 or as part of an overlay object (part of an FLA file) or a file stored on a user's computer. In one variant, dashboard management module 189 incorporates user accesses account services module (e.g., my account 110) and/or location management dashboard 189 associated with a subscribers account.

In one exemplary embodiment of the above concepts, the module 500 compiles an FLA file that becomes an SWF file, for instance, having embedded user functionality, such as mapping capabilities described in the FLA disclosed in Table 1. The inventive system integrates location coordinate information 514 of a tracking device (not shown) and a user's mapping request (input into Internet Browser 502) into one or several files resident on a user's computer. In one alternative, the location coordinate information 514 may be stored as part of pocketfinder server/database 511. In one embodiment, zone management tools 516, e.g., those described previously with relation to location dashboard management module 189, as well as optionally human interactive features 518 (e.g., zoom and pan capabilities discussed in subsequent embodiments) are added to the FLA file (e.g., example FLA file illustrated in Table 1), and subsequently embedded and complied using module 500 into an SWF file 520. To further illustrate these as well as other advantages, an example is provided that illustrates advantages of the mapping service provider application.

Mapping Application Exemplary Embodiments

Figure 24:
FIG. 24 illustrates an example of a Subscriber Location Coordinate Request for several children and pets in accordance with an embodiment of the present invention.

Referring to embodiment of FIG. 24, summer camp instructor's (e.g., user 550) mapping needs are evaluated. In one embodiment, a user's logons to the pocketfinder website 522, for instance, by typing into logon keypad depicted in FIG. 3 through user Internet Browser 502. After successful verification of logon, user 550 requests location coordinate information on a map 552 of, for instance, children or pets having a tracking device (such as those described in previous filed application Ser. No. 11/753,979 which was previously incorporated by reference in its entirety). In one variant, children include first child 554 located near a public swimming pool 556, second child 558 located across from a middle school 560, third child 564 located in wooded area 562. In yet another variant, several pets are monitored including first pet 568 located outside a neighbor's house 566, and second pet 572 located at a vet's office 570 awaiting an in-office procedure. In the above variants, each child and each pet based on their current or last known or projected location coordinate information or based on tracking device group information may require a customized procedure to assemble or overlay mapping tiles as well as tiles from one or more mapping service providers to optimize mapping tile usage as well as obtain requested mapping details associated with requested location coordinate information.

In contrast to conventional mapping service provider systems and websites, the present invention mapping system (in one embodiment) stores, for instance, in a look-up mapping service provider table 512, variables and updatable information associated with one or multiple mapping service provider (s), e.g., a first, second, third . . . mapping service providers 504, 506, and 508 (see FIG. 23). In one exemplary embodiment, look-up mapping service provider table 512 includes information that a first mapping service provider provides better detailed mapping coverage for a desired mapping region where first child 554 is located. In one variant, look-up mapping service provider table 512 includes real-time updated or historical information about, for instance, a second mapping service provider. The information may include a second mapping service provider has high speed bandwidth location services available for monitoring second child 558 during rush hour while a first mapping service provider is overutilized during this period.

In another variant, the look-up mapping service provider table 512 includes information that a third mapping service provider provides more complete or detailed mapping coverage for child 566 moving through high terrain or wooded regions or, in yet another variant, if child 566 traveled outside an immediate mapping tile or mapping tile coverage area. In another variant, the mapping tiles are reoriented (e.g., repositioned or switched in orientation) in response to a user request. In response to this user request, one mapping service provider may be contacted before another mapping service provider based upon a priority scheme, e.g., stored in look-up mapping service provider table 512.

Referring to FIGS. 18-19, the one or more management "Alert Zones" may be set. A user sets safety and danger attributes for one or more management "Alert Zones" such as "Alert on Enter", "Alert on Exit", and "Alert on Enter or Exit" from an "Area Alert Zone Type". For instance, an "Alert on Enter" occurs when a tracking device enters zone 260 or zone 262. In yet another instance, an "Alert on Exit" occurs when a tracking device exits zone 260 or zone 262. These attributes are utilized to notify individuals in contact book 116 relative to a user selectable notification process. A user selectable notification process may include transmission (and return receipt or acknowledgement) by one or more telecommunication services, e.g., SMS text messaging, cell phone (IVR), landline phone, email, and IM (Instant Messaging) as shown in FIG. 10.

Figure 26:
FIG. 26 illustrates an example of a Subscriber Mapping Reorientation Request to get a close-up view in accordance with an embodiment of the present invention.
Figure 27:
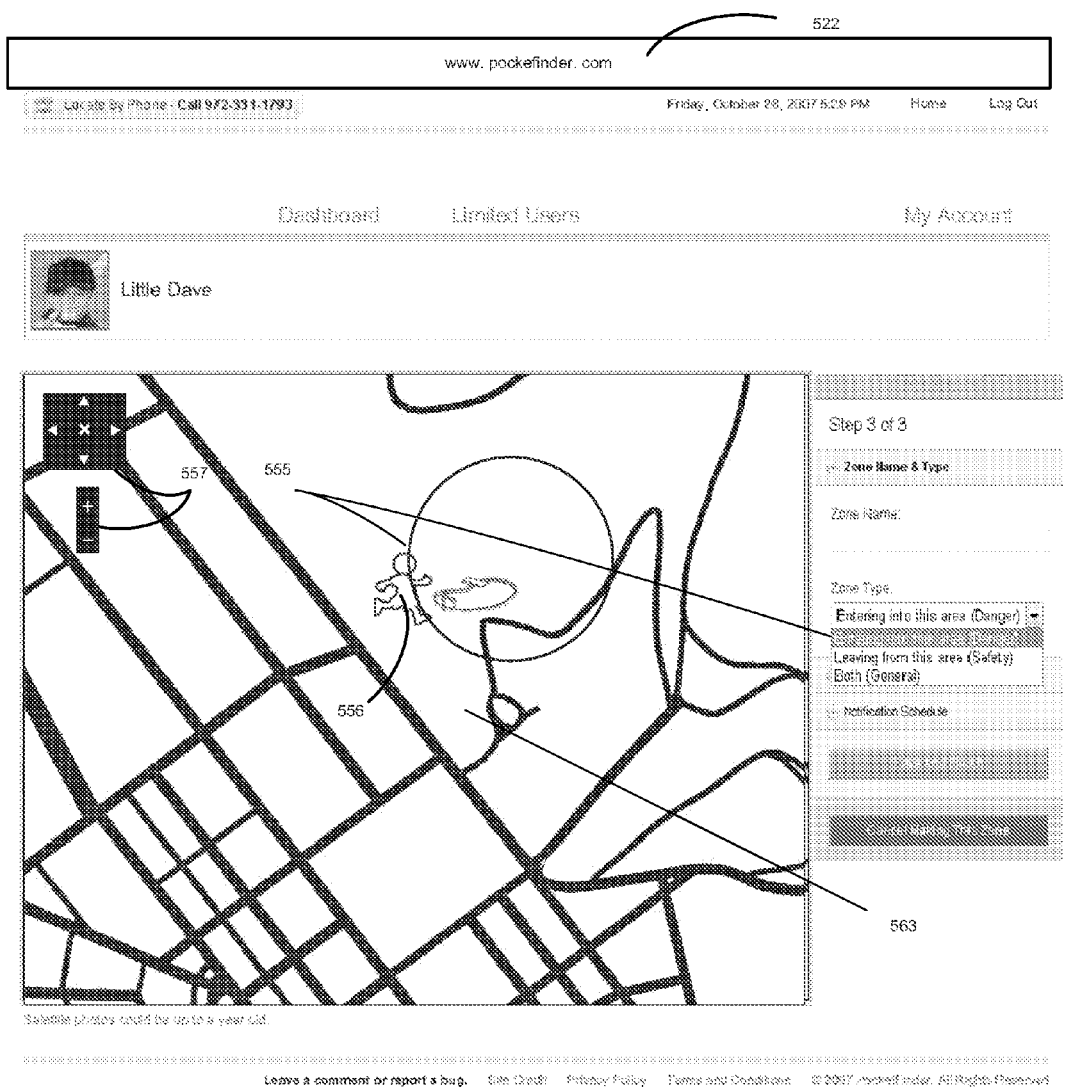
FIG. 27 illustrates an example of an Alert Zone that signals a Subscriber upon exiting of a Child having a Tracking Device from a First Zone in accordance with an embodiment of the present invention.

With regards to "Alert Zones", a user modifies or deletes one or more of these at one or more periodic (in one variant, one or more a periodic) intervals. In one variant, "Alert Zones" may be automatically generated and deleted. In one embodiment, one or more overlapping user defined alert zones may designate, for instance, a relative distance and/or region, for instance, "Alert on Enter", "Alert on Exit", and "Alert on Exit or Enter" in response to a tracking device coordinate location information. Referring to FIGS. 26-27, an alert message may be communicated to a user of a proximal location of a child 556 reaches a perimeter of an "Alert Zone", such as Zone 555, or "Alert on Exit" from "Alert Zone", such as Zone 563. More specifically, in FIG. 27, user 550 (shown in FIG. 24) views and receives an alert message or notification upon a child 556 exiting from a first zone, e.g., safe zone.

Figure 28:
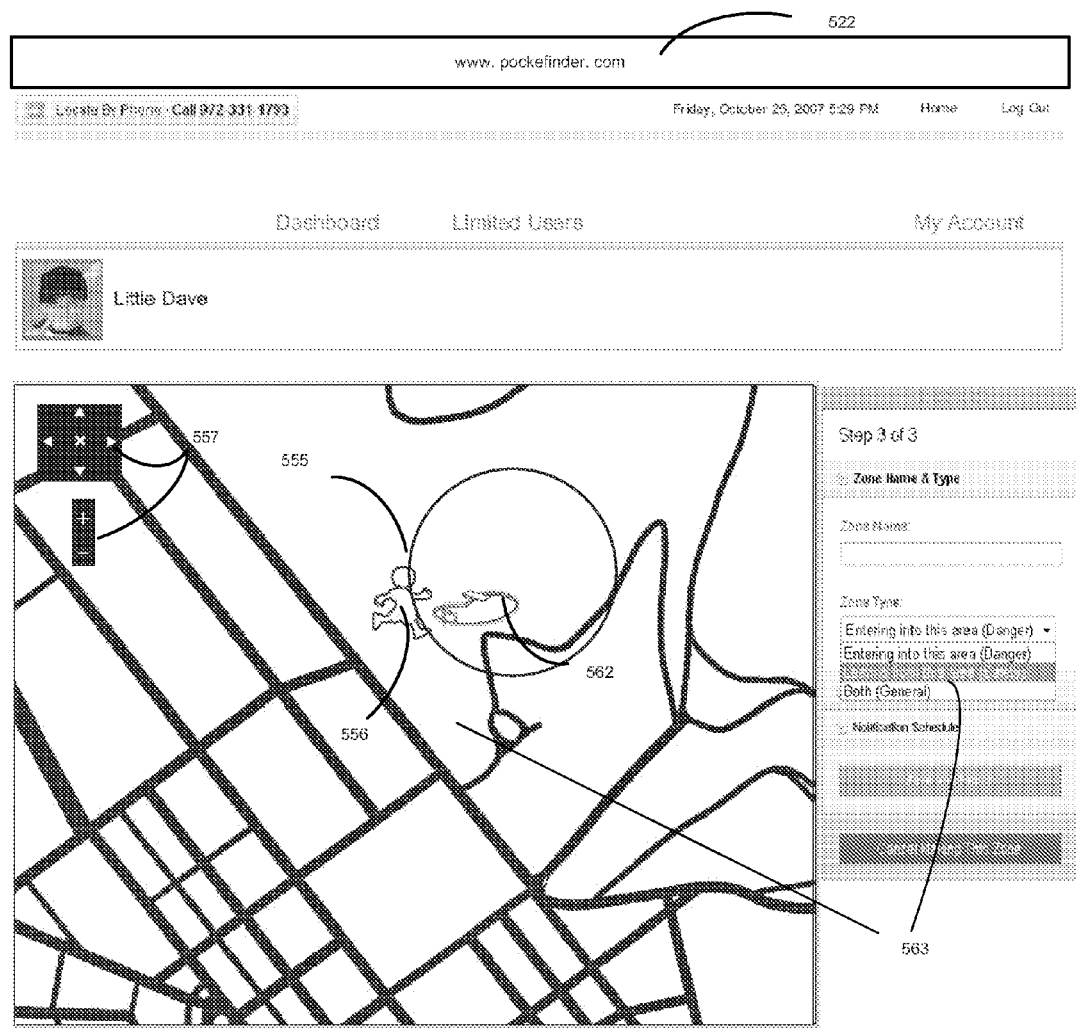
FIG. 28 an example of an Alert Zone that signals a Subscriber upon entry of a Child having a Tracking Device into a Second Zone in accordance with an embodiment of the present invention.
Figure 29:
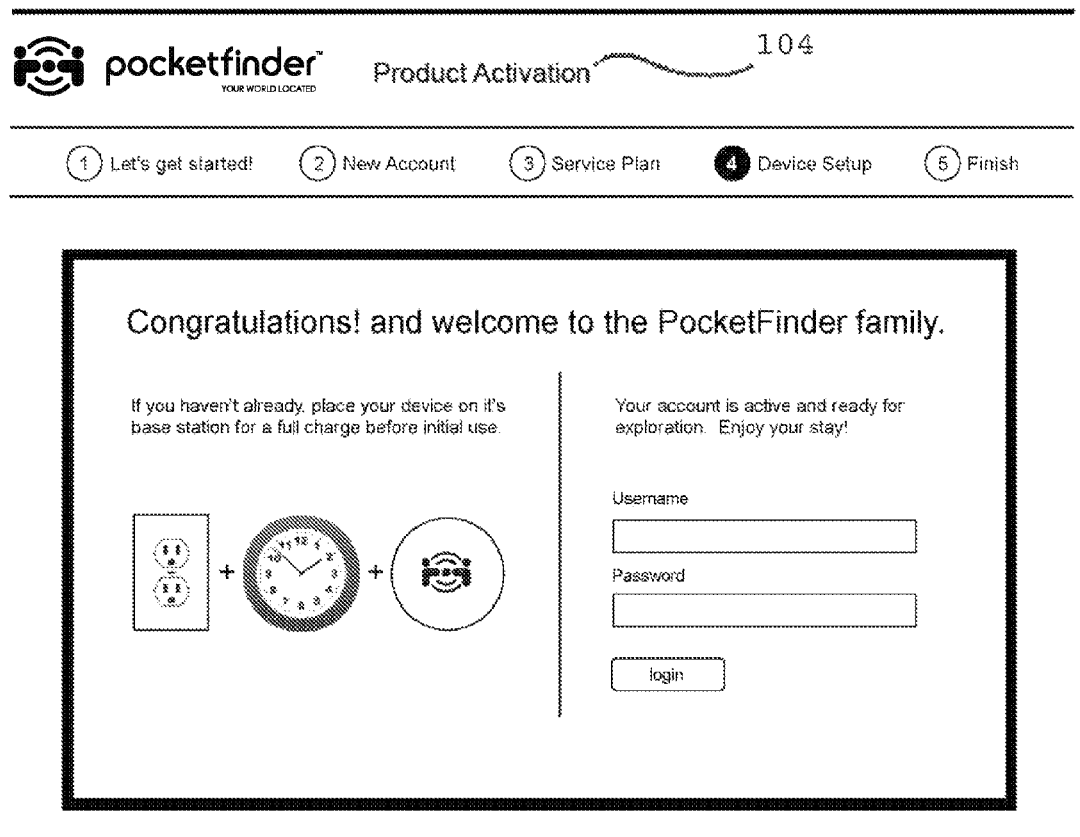
FIG. 29 illustrates a Product Activation Webpage to enter user name and password and to request place your device on its base station for a full charge in accordance with an embodiment of the present invention.
Figure 30:
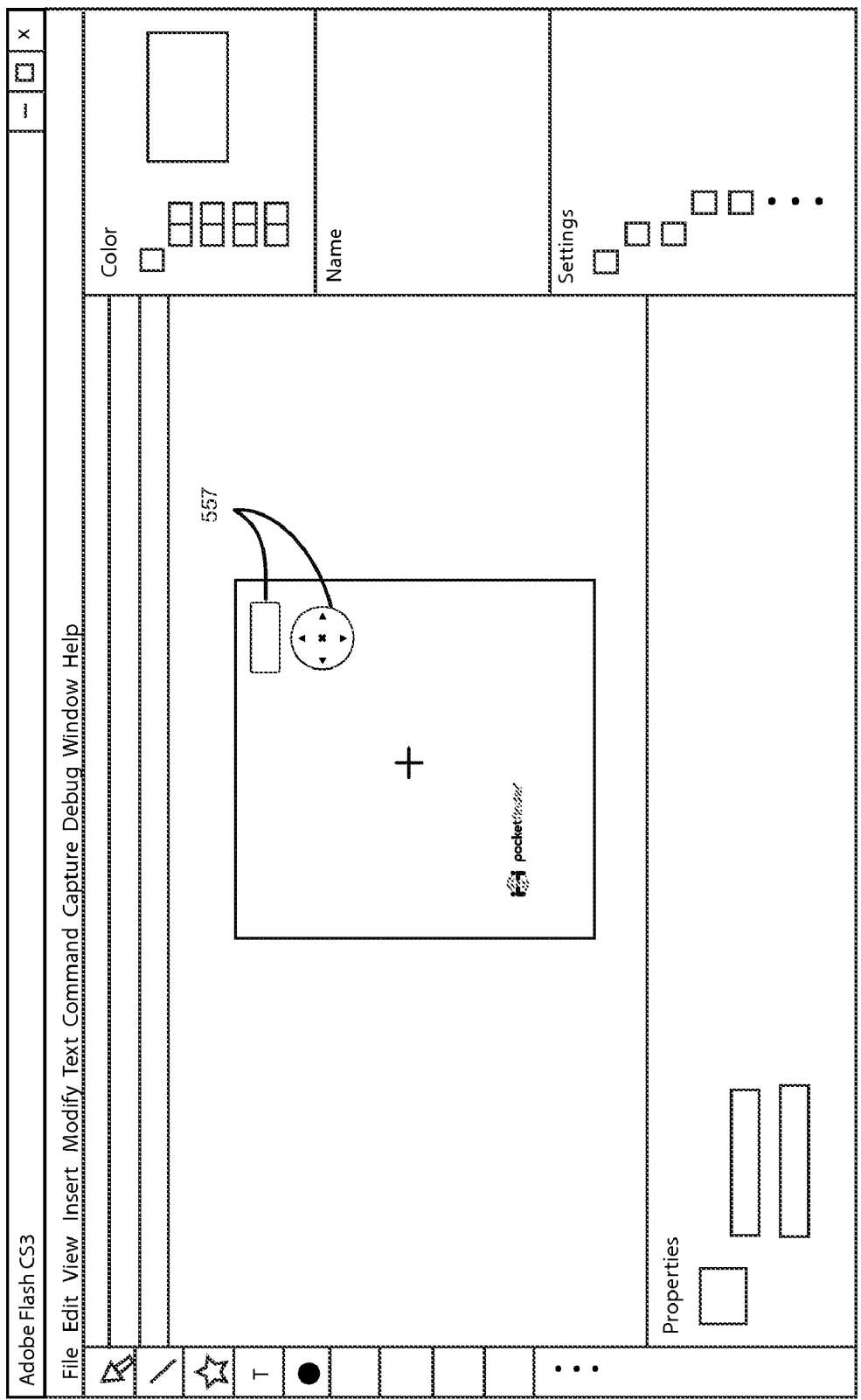
FIG. 30 illustrates a screen capture of a website illustrating inputs for an Adobe Flash CS3 Mapping Algorithm created in accordance with an embodiment of the present invention.
Figure 31:
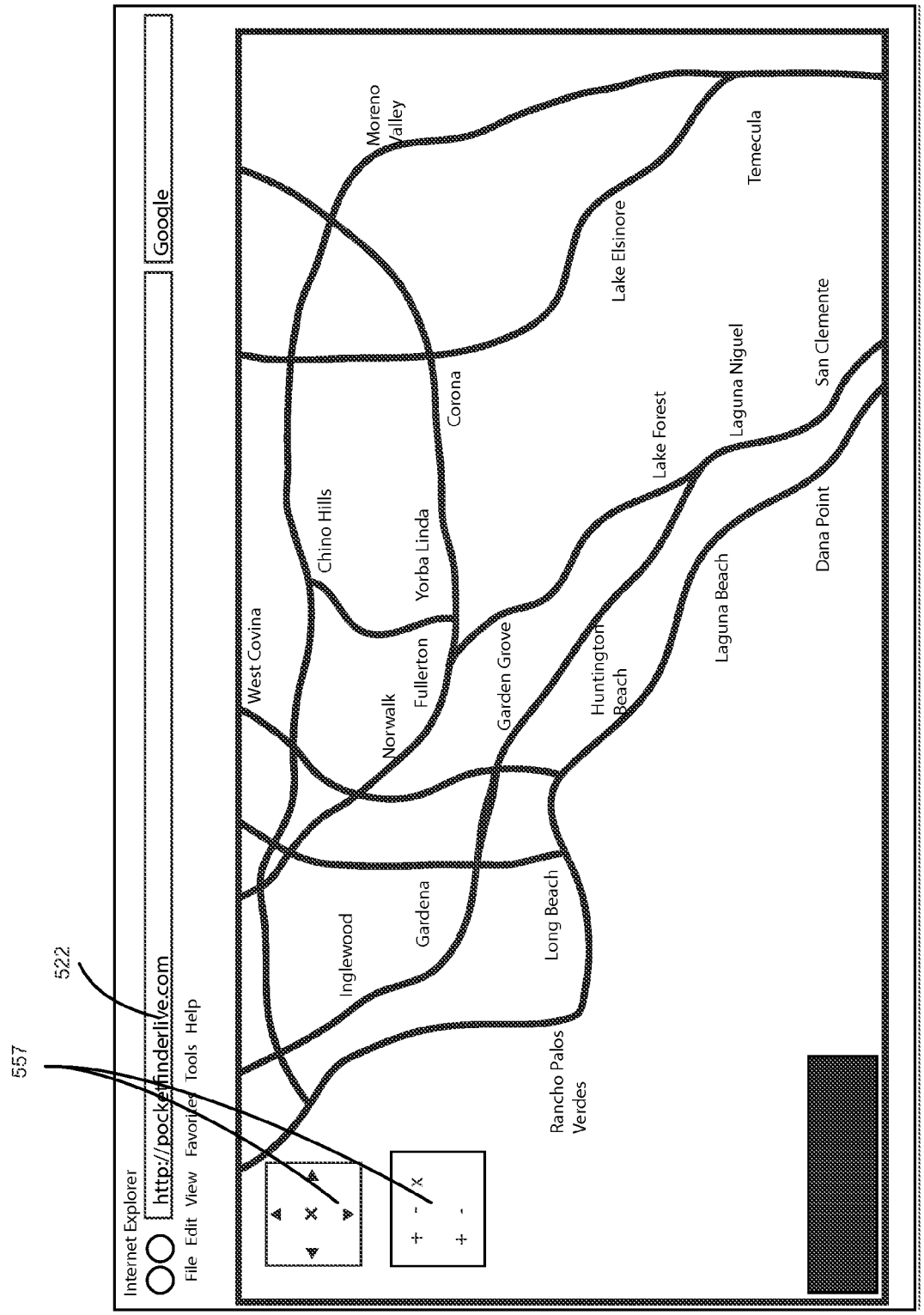
FIG. 31 illustrates a screen capture of a map generated from mapping tile providers using the Adobe Flash CS3 Mapping Algorithm of FIG. 28 in accordance with an embodiment of the present invention.

In another embodiment, a relative location coordinate error margin between "Alert Zone" and "Alert on Exit" from "Alert Zone" prevents a false alert being generated and communicated to a user. Referring to FIG. 28, user 550 (shown in FIG. 24) views and receives an alert message or notification upon a child 556 traveling from a first zone and entering a second zone, e.g., safe zone.

Continuing with this embodiment, a priority scheme (e.g., module algorithm associated with pocketfinder 511 server/database and accessible by look-up mapping service provider table 512) includes software module variables for selecting a mapping service provider such as, but not limited to, the following: mapping service provider(s) real-time and legacy performance statistics including: available Internet communication bandwidth, concurrent user capability, current user usage on a per mapping service provider basis, projected user requests on a mapping service provider based on prior usage statics, relative or absolute Internet Browser search capability for user defined tile sequences in accordance with period or time of day, type of mapping tile, quantity of requested mapping tiles, details of requested user information on a particular mapping tile, or expected or prior Browser downtime associated with one or more mapping service providers.

In one embodiment, a user's account with one mapping service provider may be underutilized for a specified period or have an accumulated amount of credit whereas another mapping service provider account may have a large available balance (credit) from which a user's requests may be charged from. In one embodiment to minimize or reduce Internet Browser bandwidth requirements, e.g., by decreasing number of required mapping tile requests while tracking objects or persons, the mapping tile and the location coordinate information for each child and pet are translated to an overlay object, e.g., module code sequence. In one variant, the overlay object is embedded in the mapping tiles. In one instance, the mapping tiles are loaded into the user's Internet Browser 502. In one embodiment, user interactive tools, such as location management dashboard module 189 described above, are integrated into the overlay object to further improve user accessing response time.

In one embodiment, a user utilizes the overlay object to zoom in and out of the requested mapping tile without additional mapping tile requests because the overlay object includes both the tracking device location information, user mapping request, and location management dashboard module 189 including, for instance, zones of coverage. In one variant, mapping tile reorientation (and user flexibility of utilizing mapping tiles) is maximized because zone management tools and human interaction tools, such as controls, e.g., zoom in and out and compass directivity controls, for location management dashboard module 189, are imbedded and compiled into the SWF file 520. Continuing with this embodiment, map manipulation tools, such as mapping orientation and reorientation, are resident, e.g., built into, the software codes associated with the mapping tiles previously provided by one or multiple mapping service providers. The software codes includes, for instance, zone management tools, such as those previously described, and human interactive functions embedded to and further compiled to create, for instance, SWF file, e.g., downloaded file 520. In one embodiment, SWF file compilations are based in part on FLA file extracted from one or more mapping service providers.

In another variant, the flash page algorithm may not be installed or blocked from a user's Internet browser. In this variant, a user may utilize the mapping tile pages without the flash page algorithm installed or blocked; in this instance, the mapping tile pages display script code indicates a link to download flash mapping algorithm, e.g., part of module 500. As a consequence, a user may download the required script code and begin utilizing flash mapping algorithm, e.g., module 500. In one alternative embodiment, the script code and a display of a static image on a screen display map, e.g., a GIF image indicates basic tracking device location coordinate information, e.g., latitude and longitude of the tracking device that is last known, available to a user when required script code is unavailable or inaccessible or selected by a user.

Figure 32:
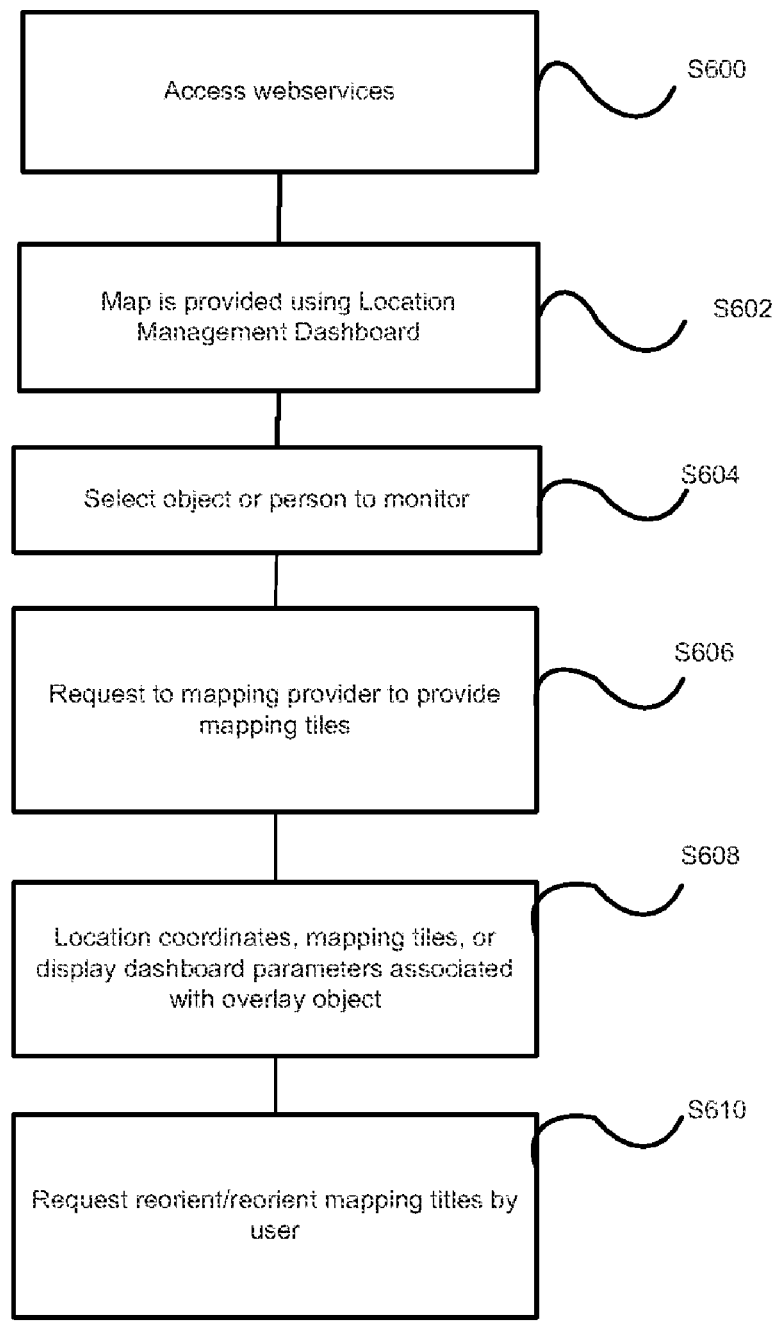
FIG. 32 illustrates a flow diagram to illustrate Module 500 functionality including handing a subscriber request for location coordinate information and mapping tile acquisition in accordance with an embodiment of the present invention.

Referring to FIG. 32, a flow chart illustrates utilization of the flash mapping algorithm in accordance with one embodiment of the present invention. In step 600, user accesses the pocketfinder service using a computer interface 602, such as on a PDA or cell phone, to access and locate a map (e.g., FIG. 24) to track one or more objects or individuals. Before utilizing the pocketfinder service, a subscriber, for instance, activates a tracking device including powering-on and receiving protocol information, e.g., activation commands and update information, from Pocketfinder server/database 511 (see FIG. 29).

In step 602, after user's access privileges are authenticated, a map is provided using, for instance, location management dashboard 189 (see FIG. 15). In step 604, user clicks on family account module 193 to select one or more family members for monitoring. In one embodiment, user requests information, including location coordinate information, of Little Dave and Spaz monitored on the Map 202 (see FIG. 15).

In step 606, a mapping service provider website is accessed, for instance, based on current bandwidth usage statistics or based on stored information in a mapping table accessible by the module 500. In one embodiment, module 500 contacts first mapping service provider website to access mapping tile information associated with Little Dave's location. If first mapping service provider website is busy, e.g., over utilized or has sluggish response time, then a second mapping service provider website is contacted. Furthermore, if a third mapping service provider is not available or sluggish, then other mapping service providers are contacted until available, e.g., n mapping service providers (where n can be any integer value).

In another embodiment, to prevent overloading first mapping service provider website, for instance, an initial request for location coordinate information associated with Little Dave, module 500 requests a third mapping service provider website to access mapping tile information associated with Spaz. As such, module 500 staggers usage of mapping service providers between and among multiple user requests to improve bandwidth responsiveness of mapping service providers as well as a user's or subscriber's computer system.

In step 608, Little Dave's and Spaz's associated mapping tiles and/or identification parameters and/or location information, e.g., current, last known, estimated, or calculated, are associated with or loaded into overlay object. In one embodiment, overlay object may previously reside on a user's computer. In another embodiment, overlay object be downloaded and stored locally in a local hard disk drive of a user's computer in response to a user's information request. Furthermore, the overlay object may be downloaded onto an alternative database or website, e.g., pocketfinder server/database 511 or even accessible through pocketfinder.com website 502.

Continuing with step 608, module 500 creates or updates overlay object in response to user inputs. In one exemplary embodiment, module 500 includes software code that creates a flash location coordinate mapping module that is downloadable to a user's computer. In one instance, module 500 loads (or inputs) Little Dave's and Spaz's location coordinates. In one variant, loading of mapping tiles associated with Little Dave's and Spaz's location coordinate information into overlay object are substantially undetected by a user. In another variant, loading of Little Dave's and Spaz's location coordinate information into overlay object are substantially undetected by a user. In yet another variant, functionality of the dashboard management module 189 is loaded into the overlay object. In one alternative variation, dashboard management module 189 includes Little Dave's zones of coverage and Spaz's zones of coverage.

Advantageously, the present invention, in one embodiment, integrates any or all the following: Little Dave's zones of coverage, Spaz's zones of coverage, and management tools associated with tracking Little Dave and Spaz as well as other features, such as those discussed in disclosed with reference to FIGS. 1-32, that may be integrated with or associated with an overlay object, e.g., depicted in FLA in Table 1, utilized advantageously by a user (e.g., subscriber) for tracking purposes.

In step 610, user may request reorientation of the mapping tiles resident in the overlay object, as shown, for instance, in Table 1, stored locally on their computer system. As a consequence, this invention advantageously allows user to reorient mapping tile(s) layout without reconnecting with a mapping service provider; thus, user time response of these subsequent location requests are improved as compared to conventional systems requiring reconnecting with a mapping service provider to receive additional views or perspectives of a previously submitted user mapping requests. As such, the present invention provides improved bandwidth responsiveness over conventional single mapping systems requiring a user to repeatedly gain access mapping titles on a mapping service provider website. For instance, the present invention, by not repeatedly requiring access to conventional single mapping systems would prevent mapping service providers being overloaded by mapping requests that may be periodically down or overloaded with mapping requests or implementing hardware or software upgrades that prevent or limit user accessibility.

In one exemplary embodiment of step 610, module 500 loads mapping information, e.g., for Little Dave or Spaz, such as user requested mapping tiles, into an overlay object. As a consequence, user requirement is reduced or eliminated for repeated accessing a mapping service provider's website, for instance, obtaining mapping tile information, for instance, when requesting mapping tile reorientation (e.g. zoom in or access mapping information, for instance, off from a central location of an initial mapping request) is within a given range of mapping tiles, e.g., perimeter of mapping tiles, previously downloaded as part of, e.g., an initial user request. In addition, user flexibility is improved because mapping tiles may be optimized for result/response time, for instance, by accessing a mapping service provider website being underutilized (e.g., not overloaded by user requests). In one embodiment, module 500 by staggering usage of mapping service provider's website bandwidth usage, e.g., first, second, and third mapping service provider websites . . . bandwidth is more efficiently utilized.

Advantageously, the present invention incorporates user interactivity and enhanced mapping resolution, e.g., multiple mapping tiles, e.g., surrounding a boundary region, from multiple mapping service providers, for instance, based on an initial user's request. In yet another embodiment, SWF file, e.g., downloaded file 520, has embedded zone management tools and human interaction tools, such as location management dashboard 189 to manipulate multiple mapping tiles into one or more user requested zoom in or zoom out or repositioning requests for mapping views. Thus, the present invention by downloading zoomed in and zoomed out mapping tiles at least partially response to a user requests provides more flexibility so that subsequent user request many not require re-accessing or revisiting a mapping service provider website.

In one variant of the above embodiment, the SWF file, e.g., downloaded file 520, has the map manipulation tools, such as map orientation and reorientation resident, e.g., built into, the software codes associated with the mapping tiles. The software codes includes, for instance, zone management tools, such as those previously described above, and human interactive functions embedded into and compiled to create, for instance, a SWF file.

Figure 25:
FIG. 25 illustrates an example of a Subscriber Mapping Reorientation Request to pan in accordance with an embodiment of the present invention.

FIGS. 24-28 illustrates exemplary embodiment of reorient and rotation capabilities of module 500 of the present invention. As depicted on a compass display in FIGS. 24-26, a last recorded velocity of child 556 was approximately 65 mph, for instance, when child 554 was previously traveling in, for instance, an automobile. As indicated in FIGS. 24-28, child 556 is currently approaching a swimming pool 562. Referring to FIG. 24, user 550 (shown in FIG. 24) indentifies child 556 to monitor. Referring to FIG. 25, user 550 (shown in FIG. 24) clicks on graphical cursor control buttons 556, to pan, reorient, zoom-in, or monitor an expanded mapping region about (e.g., zoom out) child 556 without reaccessing mapping service providers websites. Referring to FIG. 26, user 550 (shown in FIG. 24) clicks on graphical cursor control buttons 557 to achieve a close-in region (e.g., zoom in) view about child 556 without reaccessing any mapping service provider websites.

As discussed in the embodiments, the present invention creates graphical images or snap shots of a perimeter of graphical areas (both zoomed in and zoomed out versions) based on a user's request so that subsequent requests, e.g., within a mapping range selected by, for instance, pocketfinder server/database 511, so as to capture and make available alternative mapping views for subsequent user mapping reorientation requests. Furthermore, based a user specific historical statistics, other user graphical information may also be captured during a user's initial request phase. For instance, if a user typically requests information about one child, e.g., child 554, and then historically requests information on another child, e.g., child 558, then mapping tiles for both children 554, child 558 will be downloaded on an initial user request for either child's coordinates. Similarly, other historical information may be utilized by pocketfinder server/database 511 to further ease a user's accessing mapping tiles (as well as reduce subsequent requests to the same or other mapping service providers).

In one embodiment, the SWF file, e.g., downloaded file 520, compilations are based in part on the FLA file(s) extracted from one or more mapping service providers. For example, a table of mapping service providers, e.g., look-up mapping service provider table 512, may include variables, such as, mapping information capabilities as a function of current usage, predicted outage periods, actual outage periods, and previous statistical usage numbers or based on past occurrences or as a function of geographic region locations.

In this exemplary embodiment, the Flash Mapping Algorithm communicates with pocketfinder server/database 511, e.g., MSSQL database 522 (shown in FIG. 23). Referring to Table 1, FLA file includes, for instance, Adobe Flash CS3 action script coding for three mapping service providers, e.g., Virtual Earth, Google, and Yahoo. Using graphical mapping tiles from one or more mapping service providers, module 500, in one embodiment, selects satellite image quality maps from preselected towns, cities, countries, and states and recorded into pocketfinder server/database 511 (see FIGS. 30 and 31). Based on location coordinates information selected for mapping, a group of mapping tiles are selected in accordance with one or more priorities or criteria, such as those stored in the look-up mapping service provider table 512.

In one instance, if all mapping service providers provide a similar level of mapping tile quality and detail features, then pocketfinder server/database 511 may choose to spread dynamically among current and previous user requests available mapping service providers. The spreading out may be in accordance with historical usage information and/or to reduce mapping service provider charges. In event of a mapping service provider outage (which may be uncommon), but any outage may be devastating if and when it occurs. The pocketfinder server/database 511 detects such routing latencies, partial Internet brown outs, or even complete outages. Pocketfinder server/database 511 reconfigures the client Flash mapping application automatically to utilize working mapping service providers without a client even realizing or knowing of the outage.

The FLA file is compiled, for instance, into an Adobe SWF flash file (e.g., downloaded file 520). In one embodiment, when a subscriber logs onto to the pocketfinder website 522 and accesses a billing account, e.g., through a logging on the location dashboard management module 189, an Adobe SWF flash file loads (e.g., downloaded, becomes resident) onto a user's computer and loads into a subscriber's Internet Browser 502. As a consequence, the Adobe SWF flash file (e.g., SWF file) becomes functionality accessible through a subscriber's Internet Browser. The pocketserver/database 511 communicates the SWF file (e.g., downloaded file 520) including mapping routing instructions, e.g., selections from one or more mapping service providers include downloaded flash mapping tiles based at least partially on a user's request. In one exemplary embodiment, downloaded flash mapping tiles include mapping tiles about a perimeter or region of the user's request.

In one variant, pocketfinder server/database 511 accesses the Adobe SWF flash file to provide updated mapping information, e.g., updated mapping tiles if a user requests coordinate information beyond that previous provided by a mapping service provider. In one variant, the Adobe SWF flash file assesses the pocketfinder server/database 511 to obtain updated mapping information. In one embodiment, the SWF flash file loads onto a subscriber Internet Browser 502 and creates a communication portal accessible by flash application. In this embodiment, flash application manipulates graphical mapping tiles previously provided to a user to reduce client and server communication bandwidth requirements. As a consequence, service time and cost are reduced because graphical mapping tile images and shape dimensionality, for instance, are reconfigured (reoriented and panned), for instance, from cached vector image(s) from the previously supplied mapping tiles. The vector tile images are reconfigurable and reorientable based at least in part by user's mapping commands such as map skewing and map zoom functions (e.g., shown in FIGS. 24-28) such as zoom-in and zoom-out functionality and image panning as further disclosed in Table 1.

In one embodiment, user requests for mapping reorientation and tiling are optimized because device location and information sent to or associated with an overlay object; thus, tracking device coordinate information is integrated with mapping requests. Information coordinate management tools (such as from location management dashboard 189) and human interactive functions (such as zoom capability) are imbedded and compiled into the SWF file from the FLA file; thus, imbedded SWF file speeds user mapping tile requests.

To utilize the SWF file, user mapping tile request initiates the Flash application software code or downloads the software code on a user's computer. In one example, when a user requests location coordinates, for instance, for little Dave or Spaz, and pocketfinder website 522 generates an SWF file, which is loaded into module 500 including flash application code. In one embodiment, the SWF file is loaded into an HTML page of an Internet Browser using the following code:

```
<object width="500" height="400">
<param name="location coordinates" value="userrequest.swf">
<embed src="userrequest.swf" width="500" height="400">
</embed>
</object>
```

As discussed in the previous embodiments, the SWF file allows a user to manipulate mapping tiles loaded into the SWF file (within the limited of the imported mapping tiles) using the directional keys, compass, zoom-in, zoom-out, panning . . . without having to again access a mapping service providers website. Furthermore, the FLA file and a mapping service provider look-up table, e.g., including one or more mapping service providers, provides information include current and past usage history, current mapping service provider readiness status, staggering usage among pocketfinder user requests, based on a particular client's mapping service provider client funds (for instance if overspent) or if a particular mapping service provider provides lower cost maps, details of mapping service provider tiles in order to choose the mapping tiles most appropriate (responsive to) user's requested needs.

The following benefits, for instance, are achieved using the principles of the present invention including: reduced impact on bandwidth usage from mapping service providers by skipping tile retrieval and zooming in on flash tile using user tile mapping control functions, such as zoom-in, zoom-out, pan; reduction on mapping tile transactions; map reorientation and map rotation may be achieved in accordance with requests of a user. For instance, because multiple mapping tiles are integrated into a user's initial request, more degrees of tile mapping is possible than current mapping service providers such as, reorientable views or mapping positioning at 1 to 5 degree increments and CC or CCW revolution with 360 degree custom rotation angles are possible, whereas many conventional providers limit redrawing mapping flexibility. Other benefits include the compiled FLA file, being a Flash Application, is more compatible than other native mapping service provider platforms and the exemplary Flash Mapping algorithm (e.g., part of module 500) provides substantially seamless transitions when requesting services between and among multiple mapping service providers. Furthermore, the present invention provides for automatically switching between mapping service providers based upon location requests and switches between mapping service providers may occur in priority scheme based upon, for instance, mapping service provider(s) up time or speed or equipment availability.

It is noted that many variations of the methods described above may be utilized consistent with the present invention. Specifically, certain steps are optional and may be performed or deleted as desired. Similarly, other steps (such as additional data sampling, processing, filtration, calibration, or mathematical analysis) may be added to the foregoing embodiments. Additionally, the order of performance of certain steps may be permuted, or performed in parallel (or series) if desired. Hence, the foregoing embodiments are merely illustrative of the broader methods of the invention disclosed herein.

While the above detailed description has shown, described, and pointed out novel features of the invention as applied to various embodiments, it will be understood that various omissions, substitutions and changes in the form and details of the device or process illustrated may be made by those skilled in the art without departing from the spirit of the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method to provide location information on a webpage for a user in a personalized user format comprising:
providing user access to a location management dashboard module in response to detection of a successful user logon, the location management dashboard module comprising a listing of one or more groups of tracking devices the user is capable of monitoring;
providing a graphical mapping module comprising menu options in the personalized user format, the menu options comprising one or more tile mapping controls as part of a wizard menu enabling the user to reposition graphical mapping tiles for the one or more groups of tracking devices from multiple mapping service providers, the graphical mapping tiles initially requested by the user on at least one tracking device of the listing of one or more groups of tracking devices, whereby the user repositions the graphical mapping tiles received as part of the initial request without re-accessing the websites of the mapping service providers;
providing an alert message associated with the at least one tracking device in response to detection of the successful user login;
providing a request signal to obtain location coordinates of the at least one tracking device of the listing of one or more groups of tracking devices;
providing by the at least one tracking device a first reply signal that comprises a first identification code to identify the at least one tracking device; and
displaying the location coordinates of the at least one tracking device to the user in response to the request signal.

2. The method of claim 1, further comprising the step of:
providing a second tracking device from the listing of the one or more groups of tracking devices, the second tracking device having a second transceiver to receive the first reply signal, compare the first identification code to a stored identification code, and communicate to a monitoring station a second reply signal that comprises the location coordinates of the at least one tracking device in part responsive to verification of the first identification code.

3. The method of claim 1, wherein the menu options of the at least one tracking device comprises selectable icons to graphically represent on a map an object or individual; and
wherein the graphical mapping tiles are chosen for the selectable icons in accordance with an algorithm stored in a mapping service provider look-up table to allocate graphical mapping requests between one or more graphical mapping service providers in accordance with at least one of cost or user response time or user credit available among the one or more graphical mapping service providers.

4. The method of claim 1, wherein the graphical mapping tiles are chosen in accordance with an algorithm stored in a mapping service provider look-up table to minimize system bandwidth of graphical mapping requests among one or more graphical mapping service providers.

5. The method of claim 4, wherein the graphical mapping tiles are chosen in accordance with information stored in the graphical mapping module to custom choose graphical mapping tiles from the one or more graphical mapping service providers in accordance with legacy information of the one or more graphical mapping service providers having a maximum number of user requested mapping details.

6. An expanded cellular communication system interface comprising:
   a user dashboard interface module configured to monitor a group of tracking devices in accordance with user selected coverage zones;
   wherein the user selected coverage zones comprise regions associated with one or more mapping areas determined to be at least one of an alert on enter and an alert on exit;
   an alert module configured to generate an alert message in accordance with detecting a breach condition of one or more of the user selected coverage zones; and
   an identification module configured to be user selectable to remotely set control variables of an individual or an object associated with a tracking device of the group of tracking devices to partially establish conditions determining if the breach condition of one or more of the user selected coverage zones occurred; and
   a graphical tile mapping module for accessing user requested graphical mapping tiles for the group of tracking devices from multiple graphical mapping service providers in accordance with entries in a stored look-up mapping service provider table as to having historically quickest response time based on at least one of variables including time of day or current available Internet Bandwidth and compiling the graphical mapping tiles and user wizard controls from the user dashboard interface module to realize a graphical tile mapping reorientation function that does not require reaccessing the multiple graphical mapping service providers during a user mapping reorientation request.

7. The system of claim 6, wherein the alert module provides the alert message upon a user successfully logon to the user dashboard interface module, and wherein upon the user successfully logon, a downloaded module provides user flexibility of mapping reorientation and panning about a previously defined mapping area without requesting any Internet communication or requiring addition inputs from the multiple graphical mapping service providers.

8. The system of claim 6, further comprising an icon module that provides graphical representations of the group of tracking devices; wherein the icon module provides capability of selecting the tracking device to monitor and provide location coordinate information of the tracking device by another device of the group of tracking devices upon detection of no response by a monitoring system of the location coordinates of the tracking device during a specified period.

9. The system of claim 6, further comprising a battery management module capable of powering-down the tracking device for a specified period in response to a tracking device monitoring system not detecting the location coordinates of the tracking device.

10. The system of claim 6, further comprising a battery management module capable of powering-on the tracking device for a specified period in response to a monitoring station previously powering-down the tracking device in response to the monitoring system not detecting location coordinates of the tracking device.

* * * * *